US010685041B2

(12) United States Patent
Hattori

(10) Patent No.: US 10,685,041 B2
(45) Date of Patent: *Jun. 16, 2020

(54) DATABASE SYSTEM, COMPUTER PROGRAM PRODUCT, AND DATA PROCESSING METHOD

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Masakazu Hattori, Inagi Tokyo (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 317 days.

This patent is subject to a terminal disclaimer.

(21) Appl. No.: 15/047,252

(22) Filed: Feb. 18, 2016

(65) Prior Publication Data
US 2016/0162562 A1 Jun. 9, 2016

Related U.S. Application Data

(63) Continuation of application No. PCT/JP2013/072305, filed on Aug. 21, 2013.

(51) Int. Cl.
*G06F 16/21* (2019.01)
*G06F 16/27* (2019.01)
(Continued)

(52) U.S. Cl.
CPC .......... *G06F 16/278* (2019.01); *G06F 16/21* (2019.01); *G06F 16/22* (2019.01); *G06F 16/2379* (2019.01)

(58) Field of Classification Search
None
See application file for complete search history.

(56) References Cited

U.S. PATENT DOCUMENTS 5,555,404 A 9/1996 Torbj Rnsen Ystein, et al.
5,970,495 A * 10/1999 Baru .................... G06F 9/5088
(Continued)

FOREIGN PATENT DOCUMENTS

JP 03-092942 4/1991
JP 09-146812 6/1997
(Continued)

OTHER PUBLICATIONS

Final Office Action for U.S. Appl. No. 14/206,819 dated Jun. 29, 2016.
(Continued)

*Primary Examiner* — Thu N Nguyen
(74) *Attorney, Agent, or Firm* — Amin, Turocy & Watson, LLP

(57) ABSTRACT

According to an embodiment, a database system includes nodes and a management device. The management device includes first and second assigning units. Depending on change in state of each node, the first assigning unit assigns a first node storing data pieces and receiving an access request to the data pieces, and assigns a second node serving as a backup node, and instructs each node to perform operations according to assignment. Depending on state of nodes and change in assignment state, the second assigning unit assigns a third node as a candidate node serving as the first node, and instructs each node to make preparation for causing the third node to operate as the first node. Each node sends, to the third node, a snapshot of the data pieces at the first time point and an operation log according to the access request at and after the first time point.

10 Claims, 25 Drawing Sheets

(51) Int. Cl.
*G06F 16/23* (2019.01)
*G06F 16/22* (2019.01)

(56) References Cited

U.S. PATENT DOCUMENTS

| | | | |
|---|---|---|---|
| RE37,600 E * | 3/2002 | Weinger | |
| 6,421,687 B1 | 7/2002 | Klostermann | |
| 6,438,707 B1 | 8/2002 | Ronstrom | |
| 6,643,656 B2 | 11/2003 | Peterson | |
| 6,748,508 B1 | 6/2004 | Khandelwal et al. | |
| 6,883,112 B2 | 4/2005 | Maeda et al. | |
| 6,915,409 B1 | 7/2005 | Peterson | |
| 7,152,184 B2 | 12/2006 | Maeda et al. | |
| 7,370,029 B2 | 5/2008 | Ito et al. | |
| 7,425,944 B1 | 9/2008 | Peterson | |
| 7,596,757 B2 | 9/2009 | Kowalski et al. | |
| 8,041,685 B2 | 10/2011 | Ito et al. | |
| 8,195,777 B2 | 6/2012 | Hanai et al. | |
| 8,280,574 B2 | 10/2012 | Yabushita et al. | |
| 9,081,695 B2 | 7/2015 | Tsuchimoto et al. | |
| 9,268,650 B2 | 2/2016 | Min | |
| 9,305,072 B2 | 4/2016 | Urano | |
| 9,367,261 B2 | 6/2016 | Iwashita | |
| 2003/0051111 A1 | 3/2003 | Nakano et al. | |
| 2003/0097533 A1 | 5/2003 | Maeda et al. | |
| 2004/0109436 A1 | 6/2004 | Vargas et al. | |
| 2005/0132157 A1 | 6/2005 | Maeda et al. | |
| 2005/0278392 A1 | 12/2005 | Hansen et al. | |
| 2006/0117073 A1 | 6/2006 | Bosworth et al. | |
| 2006/0117154 A1 | 6/2006 | Suishu et al. | |
| 2006/0203718 A1 * | 9/2006 | Benhase | G06F 11/2058 370/220 |
| 2007/0185923 A1 | 8/2007 | Nishikawa et al. | |
| 2007/0198802 A1 | 8/2007 | Kavuri | |
| 2008/0005508 A1 | 1/2008 | Asano et al. | |
| 2008/0147673 A1 | 6/2008 | Candea et al. | |
| 2008/0288630 A1 | 11/2008 | Merat et al. | |
| 2009/0049240 A1 | 2/2009 | Oe et al. | |
| 2009/0193206 A1 | 7/2009 | Ishii et al. | |
| 2009/0210533 A1 | 8/2009 | Verhaegh et al. | |
| 2009/0210642 A1 | 8/2009 | Yagawa et al. | |
| 2009/0216975 A1 | 8/2009 | Halperin et al. | |
| 2010/0076939 A1 | 3/2010 | Iwaki et al. | |
| 2010/0114949 A1 | 5/2010 | Sakamoto | |
| 2010/0306495 A1 | 12/2010 | Kumano et al. | |
| 2010/0315946 A1 | 12/2010 | Salam et al. | |
| 2011/0016090 A1 | 1/2011 | Krishnaprasad et al. | |
| 2011/0055182 A1 | 3/2011 | Buban et al. | |
| 2011/0283277 A1 | 11/2011 | Castillo et al. | |
| 2011/0289049 A1 | 11/2011 | Zeng et al. | |
| 2012/0078849 A1 | 3/2012 | Bryant et al. | |
| 2012/0137094 A1 * | 5/2012 | Gupta | G06F 17/30212 711/162 |
| 2012/0166390 A1 | 6/2012 | Merriman et al. | |
| 2013/0031051 A1 | 1/2013 | Mujumdar et al. | |
| 2013/0132450 A1 | 5/2013 | Tsuchimoto et al. | |
| 2013/0138904 A1 | 5/2013 | Min | |
| 2013/0149678 A1 * | 6/2013 | Tokuda | G09B 19/0092 434/127 |
| 2013/0166606 A1 * | 6/2013 | Fricke | G06F 17/30584 707/803 |
| 2014/0032496 A1 | 1/2014 | Urano | |
| 2014/0059315 A1 | 2/2014 | Iwashita | |
| 2014/0074891 A1 * | 3/2014 | Davis | G06F 7/00 707/791 |
| 2014/0279902 A1 | 9/2014 | Hattori | |
| 2016/0171073 A1 | 6/2016 | Hattori | |
| 2017/0237683 A1 * | 8/2017 | Vlachogiannis | H04L 47/745 707/722 |

FOREIGN PATENT DOCUMENTS

| | | |
|---|---|---|
| JP | 11-506556 | 6/1999 |
| JP | 2000-132441 | 5/2000 |
| JP | 2001-508900 | 7/2001 |
| JP | 2002-522845 | 7/2002 |
| JP | 2003-122509 | 4/2003 |
| JP | 2003-223287 | 8/2003 |
| JP | 2003-345640 | 12/2003 |
| JP | 2005-196602 | 7/2005 |
| JP | 2007-200114 | 8/2007 |
| JP | 2007-524933 | 8/2007 |
| JP | 2008-015623 | 1/2008 |
| JP | 2008-310591 | 12/2008 |
| JP | 2009-157785 | 7/2009 |
| JP | 2009-527971 | 7/2009 |
| JP | 2009-181206 | 8/2009 |
| JP | 2011-513816 | 4/2011 |
| JP | 2012-221419 | 11/2012 |
| JP | 2013-008291 | 1/2013 |
| JP | 2013-109672 | 6/2013 |
| JP | 2013-114556 | 6/2013 |
| WO | 2013/046352 A1 | 4/2013 |

OTHER PUBLICATIONS

Chinese Office Action for Chinese Patent Application No. 201380003048.1 dated Jul. 4, 2016.
Non-Final Office Action for U.S. Appl. No. 14/206,819 dated Feb. 16, 2016.
10gen, "Replication-MongoDB Manual Contents", <http://docs.mongodb.org/manual/replication/>.
10gen, "Sharding-MongoDB Manual Contents", <http://docs.mongodb.org/manual/sharding/>.
10gen, "MongoDB Manual Contents", retrieved at <http://docs.mongodb.org/manual/contents/>.
International Search Report for International Patent Application No. PCT/JP2013/072305 dated Nov. 5, 2013, 2 pages.

* cited by examiner

FIG.3

| DATA-RETENTION TABLE | | PARTITION | | |
|---|---|---|---|---|
| | | PARTITION #1 | PARTITION #2 | PARTITION #3 |
| NODE | NODE A | 80 | | 60 |
| | NODE B | 80 | 100 | |
| | NODE C | | 90 | 60 |

FIG.4

| CURRENT-ROLE TABLE | | PARTITION | | |
|---|---|---|---|---|
| | | PARTITION #1 | PARTITION #2 | PARTITION #3 |
| NODE | NODE A | OWNER | NONE | BACKUP |
| | NODE B | BACKUP | OWNER | NONE |
| | NODE C | NONE | NONE | OWNER |

FIG.5

| NEXT-ROLE TABLE | | PARTITION | | |
|---|---|---|---|---|
| | | PARTITION #1 | PARTITION #2 | PARTITION #3 |
| NODE | NODE A | OWNER | NONE | BACKUP |
| | NODE B | BACKUP | OWNER | NONE |
| | NODE C | NONE | NONE | OWNER |

FIG.6

| TARGET-ROLE TABLE | | PARTITION | | |
|---|---|---|---|---|
| | | PARTITION #1 | PARTITION #2 | PARTITION #3 |
| NODE | NODE A | MID-BACKUP | | MID-BACKUP |
| | NODE B | MID-BACKUP | MID-BACKUP | |
| | NODE C | | MID-BACKUP | MID-BACKUP |

FIG.9
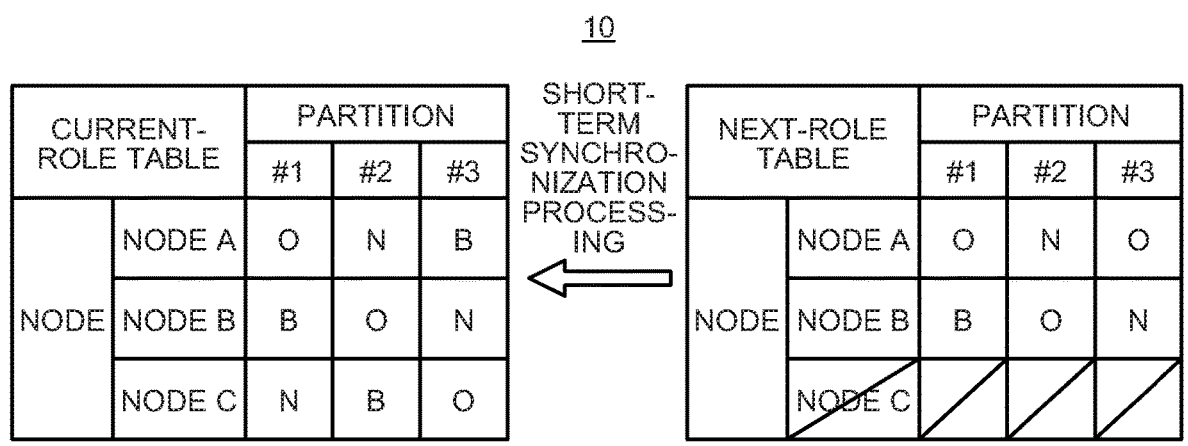
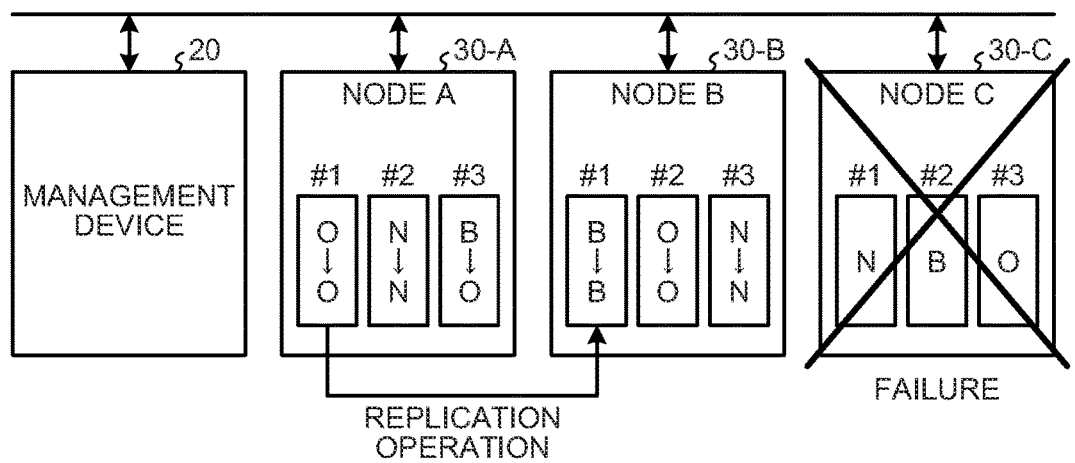

DATABASE SYSTEM, COMPUTER PROGRAM PRODUCT, AND DATA PROCESSING METHOD

CROSS-REFERENCE TO RELATED APPLICATIONS

This application is a continuation of PCT international application Ser. No. PCT/JP2013/072305 filed on Aug. 21, 2013 which designates the United States, incorporated herein by reference.

FIELD

An embodiment of the present invention is related to a database system, a program, and a data processing method.

BACKGROUND

Shared-Nothing Type Database

Conventionally, a shared-nothing type database system is known in which a plurality of database nodes is connected to each other by a network.

Each of a plurality of database nodes is a computer that has individual resources such as a processor, a memory, and a storage. In a shared-nothing type database system, total separation of resources is achieved for each database node. Hence, there occurs no access competition among the database nodes. As a result, in a shared-nothing type database system, if the number of database nodes is increased, the performance can be enhanced in a linear manner. That is, in a shared-nothing type database system, it is possible to efficiently implement the scale-out capability in which database nodes are added.

Partitioning

In a shared-nothing type database system, it is possible to implement a technology called partitioning in which a database is divided into a plurality of data pieces (called partitions), and each of the divided data pieces is stored in a plurality of database nodes in a distributed manner. In a shared-nothing type database system in which partitioning is implemented, it becomes possible to store smaller data pieces in each database node. As a result, an access from a client can be distributed among a plurality of database nodes.

Sharding

There is one database technology called sharding. In sharding, data is divided into smaller pieces of data which are automatically distributed and stored in a plurality of database nodes. Thus, sharding is a similar technology to the partitioning technology implemented in a shared-nothing type database system.

Distributed Key-Value Type Database

Key-value type databases are known. A key-value type database is a database that is based on a simple data model made of pairs of keys and values in an identical manner to the associative arrays or Map of a programming language. Moreover, a distributed key-value type database is also known in which a key-value type database is distributed by performing sharding with the use of keys.

In a key-value type database, since the data model is simple in nature, it is easy to perform sharding and partitioning operations. Moreover, in a distributed key-value type database, a plurality of key-value type database nodes can be used to process large-scale data pieces which cannot be handled in a single key-value type database node. Hence, if a distributed key-value type database is implemented in a shared-nothing type database containing a plurality of database nodes, then it becomes possible to implement a large-scale database system having the scale-out capability.

Moreover, in a shared-nothing type database system in which a distributed key-value type database is implemented (hereinafter, called a scale-out type database system); if the data is placed in an equal manner in a plurality of database nodes, then an access from a client can be distributed so as to enhance the throughput and the response on the whole.

In a scale-out type database system, a technology called replication is implemented in which a copy (replica) of the data is stored in other database nodes. In a scale-out type database system, as a result of performing replication, even if a failure occurs in a particular database node, the services can be continued using a database node in which the replica has been stored. The number of database nodes in which the replica of the data is stored is called redundancy. In a scale-out type database system, the redundancy is set to, for example, 2 or 3.

Herein, in a scale-out type database system, if a failure occurs in a database node, and if the database node in which a failure has occurred is separated off; then the redundancy decreases from the value which has been set in advance. However, if the scale-out type database system is kept running with a decreased redundancy for a long period of time, then any further database node failure is highly likely to cause the entire system to stop working or cause a wide range of data loss. For that reason, in a scale-out type database system, it is necessary to have a mechanism by which, after a failure occurs in a database node, a new database node is added and a data replica is stored in the added database node so as to restore the redundancy to the original.

Moreover, in a scale-out type database system, depending on the manner in which data is placed; there are times when the volume of stored data is not equal among the database nodes. Moreover, in a scale-out type database system, depending on the manner in which data is placed; there are times when the traffic from clients is not equal among the database nodes.

If such inequality in the placement of data grows large; then, in a scale-out type database system, the database nodes having a large volume of data or the database nodes that are accessed from clients take a relatively long period of time to perform operations. Since one of the merits of a scale-out type database system is to enable distribution of an access from a client, inequality in the placement of data results in losing that merit.

With the aim of solving the abovementioned issues of a decrease in the redundancy and inequality in the placement of data; in a scale-out type database system, at the point of time when inequality occurs in the placement of data, it is necessary to perform an operation of relocating the data among a plurality of database nodes.

However, in a conventional database system, such an operation of relocation needs to be performed with the services stopped. Moreover, in a conventional database system, the operation of relocating the data has an extremely high processing load. Hence, unless that operation is performed in an efficient manner, the processing efficiency undergoes a decline in a significant way. Moreover, the database system is required to efficiently and securely perform such an operation of relocation.

BRIEF DESCRIPTION OF THE DRAWINGS

FIG. 3 is a diagram illustrating an example of a data retention table;

FIG. 4 is a diagram illustrating an example of a current-role table;

FIG. 5 is a diagram illustrating an example of a next-role table;

FIG. 6 is a diagram illustrating an example of a target-role table;

FIG. 9 is a diagram for explaining short-term synchronization processing;

DETAILED DESCRIPTION

According to an embodiment, a database system includes a plurality of nodes in which a database is stored; and a management device configured to manage the plurality of nodes. The management device includes a first assigning unit and a second assigning unit. The first assigning unit assigns, depending on a change in a state of each of the plurality of nodes, a first node, which stores therein data pieces and receives an access request with respect to the data pieces, and assigns a second node, which stores therein the data pieces and serves as a backup node for the first node, and instructs each of the plurality of nodes to perform operations according to assignment. The second assigning unit assigns, depending on a state of the plurality of nodes and depending on a change in assignment state of the first node and the second node, a third node which is a candidate node to serve as the first node or the second node, and instructs each of the plurality of nodes to make preparation for causing the third node to operate as the first node or the second node. Each of the plurality of nodes includes a transferring unit to send, to the third node, a snapshot of the data pieces of the first node or the second node at a first point of time and an operation log according to the access request with respect to the data pieces of the first node at and after the first point of time.

Figure 1:
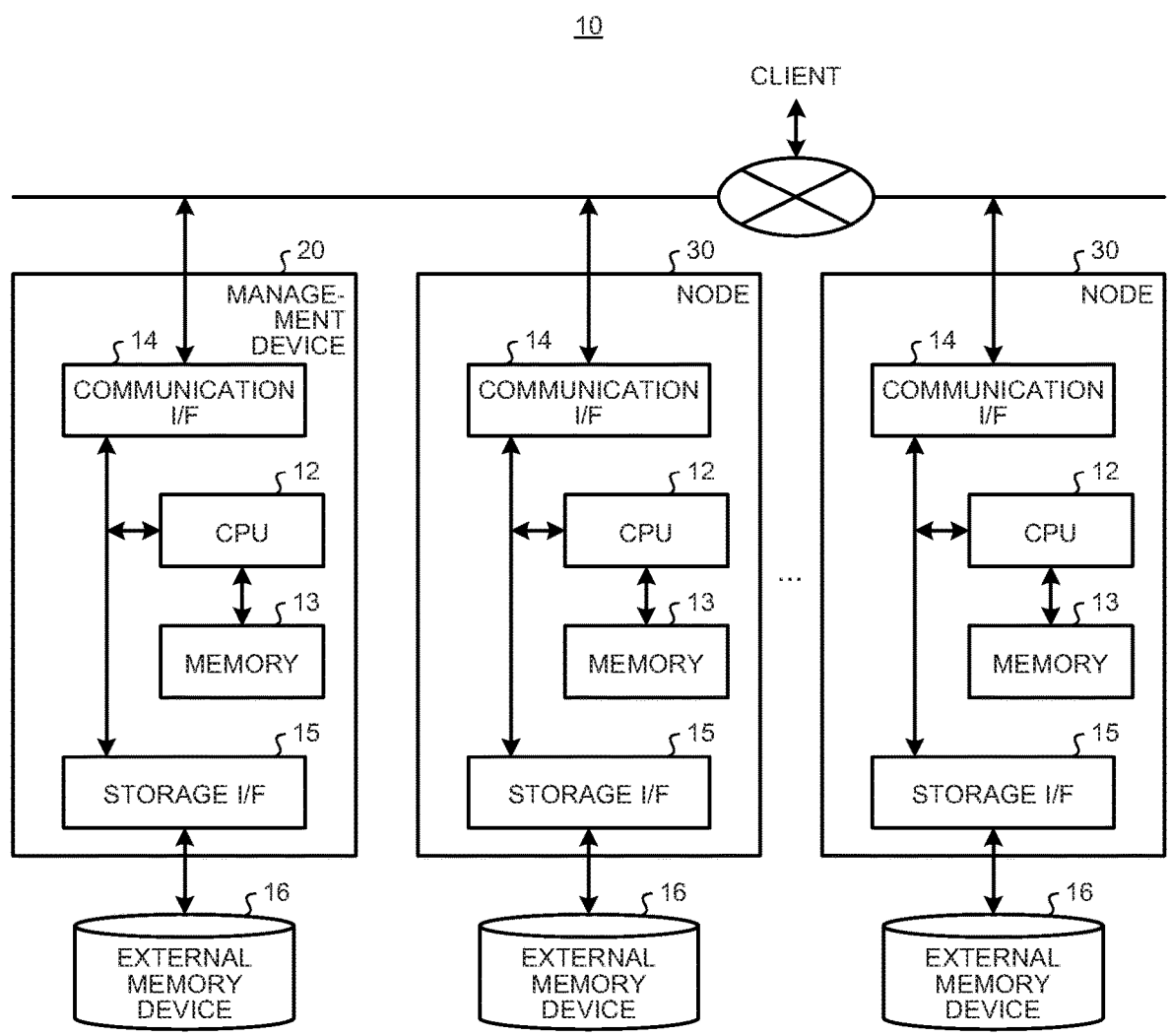
FIG. 1 is a diagram illustrating a hardware configuration of a database system according to an embodiment.

FIG. 1 is a diagram illustrating a hardware configuration of a database system 10 according to an embodiment. The database system 10 receives a database access request (such as a reference request, an update request, or a registration (insert) request) from a client that is an external computer via a network, and performs operations according to the received access request.

The database system 10 includes a management device 20 and a plurality of nodes 30. The management device 20 and a plurality of nodes 30 are connected to each other via a network. In FIG. 1, although only two nodes 30 are illustrated, the database system 10 can also include three or more nodes 30.

As an example, the database system 10 is a database system in which a distributed key-value type database is implemented in a shared-nothing type database and which has the scale-out capability. In this database system 10, although the data pieces are distributed to a plurality of nodes 30, the database system 10 is accessed as a single massive database by a client that is an external computer.

The management device 20 as well as each of a plurality of nodes 30 is a computer that is independent from each other as far as the hardware is concerned. Each of a plurality of nodes 30 independently receives an access request from a client, and is capable of independently performing operations according to the access request.

As an example, the management device 20 as well as each of a plurality of nodes 30 includes a CPU (Central Processing Unit) 12, a memory 13, a communication I/F 14, and a storage I/F 15. Moreover, the management device 20 as well as each of a plurality of nodes 30 is connected to an external memory device 16 via the corresponding storage I/F 15. Alternatively, the external memory device 16 can also be installed inside the nodes 30.

In the database system 10, a database is stored so as to be partitioned into a plurality of partitions. The number of partitions is set in advance. Regarding the method of partitioning, any method can be implemented as long as it is determined in advance.

With respect to each of a plurality of partitions, each of a plurality of nodes 30 is assigned either to serve as an owner node, or to serve as a backup node, or neither to serve as an owner node nor to serve as a backup node.

An owner node stores therein the data pieces present in the corresponding partitions; and receives access requests from clients with respect to the data pieces of the corresponding partitions and processes the access requests. A backup node stores therein the data pieces present in the corresponding partitions; and, for example, if a failure occurs in the owner node, backs the owner node up by taking over the role of the owner node. Meanwhile, instead of the terminology such as owner nodes and backup nodes, there are times when the terminology such as master nodes and slave nodes is also used.

The management device 20 manages a plurality of nodes 30. As an example, with respect to each of a plurality of partitions, the management device 20 assigns the node 30 that would serve as the owner node and assigns the node 30 that would serve as the backup node.

In this case, regarding the nodes 30 assigned to serve as the backup nodes, the management device 20 does the assignment in such a way that the redundancy is maintained within a predetermined range. With that, even if a failure occurs in any node 30, the database can be restored to the original to the extent possible. Moreover, regarding the nodes 30 assigned to serve as the owner nodes and the nodes 30 assigned to serve as the backup nodes, the management device 20 does the assignment in such a way that the data pieces included in the database are placed in a plurality of nodes 30 in a distributed manner.

Meanwhile, the management device 20 can also be configured in any one of the nodes 30. Alternatively, the node 30 that would function as the management device 20 may be selected according to an arbitrary algorithm. In case a failure occurs in the node 30 functioning as the management device 20, another node 30 may function as the management device 20.

In the database system 10, if a failure occurs in any one of a plurality of nodes 30, it becomes possible to separate off the node 30 in which a failure has occurred. Besides, in the database system 10, it is possible to newly add the nodes 30 and enhance the database performance.

Figure 2:
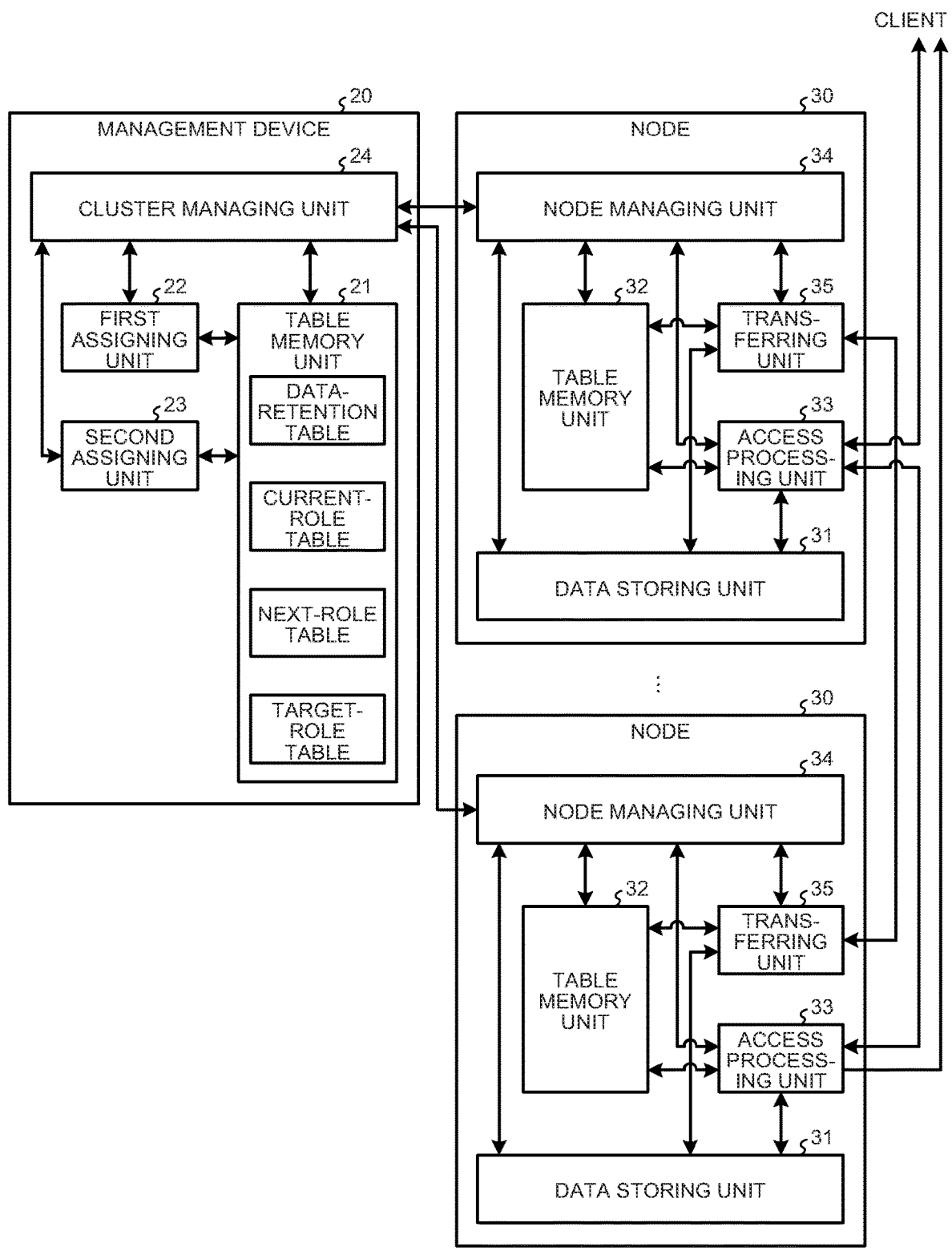
FIG. 2 is a diagram illustrating a functional configuration of the database system according to the embodiment.

FIG. 2 is a diagram illustrating a functional configuration of the database system 10 according to the embodiment.

The management device 20 includes a table memory unit 21, a first assigning unit 22, a second assigning unit 23, and a cluster managing unit 24. The first assigning unit 22, the second assigning unit 23, and the cluster managing unit 24 are implemented when the CPU 12 of the management device 20 runs programs. Alternatively, the first assigning unit 22, the second assigning unit 23, and the cluster managing unit 24 can be implemented either partially or entirely using hardware circuitry. The table memory unit 21 is implemented using the memory 13 of the management device 20 or using the external memory device 16.

The table memory unit 21 is used to store four tables that are created for the purpose of deciding the role of each of a plurality of nodes 30 with respect to each of a plurality of partitions. Each of the four tables can be data in the table form or can be data in a form other than the table form.

More particularly, the table memory unit 21 is used to store a data retention table, a current-role table, a next-role table, and a target-role table.

The data retention table is used to store the time stamp of each of a plurality of nodes 30 with respect to each of a plurality of partitions. A time stamp represents the update history about the data pieces in corresponding partitions stored in a corresponding node 30. As an example, a time stamp is a value that is incremented after every instance of updating the corresponding data pieces. Thus, the node 30 having the largest time stamp with respect to a particular partition represents the node 30 that stores therein the latest data pieces with respect to the particular partition.

Meanwhile, in the case when the size of the database increases with time; then, instead of storing the time stamps, the data retention table may store the size or the data count about the data pieces in the corresponding partitions stored in the corresponding node 30.

As an example, as illustrated in FIG. 3, in the data retention table, the nodes 30 are identified by rows, while the partitions are identified by columns. In this case, in the data retention table, in each cell having an intersection between a row and a column is specified the time stamp which is stored in the node 30 identified by that row and which is of the data pieces of the partition identified by that column.

The current-role table stores therein the assigned role in the database for each of a plurality of nodes 30 with respect to each of a plurality of partitions. More particularly, the current-role table specifies, with respect to each of a plurality of partitions, whether each of a plurality of nodes 30 is assigned either to serve as an owner node, or to serve as a backup node, or neither to serve as an owner node nor to serve as a backup node.

As an example, as illustrated in FIG. 4, in the current-role table, the nodes 30 are identified by rows, while the partitions are identified by columns. In this case, in the current-role table, in each cell having an intersection between a row and a column is specified the role assigned to the node 30 identified by that row and assigned with respect to the partition identified by that column. In the drawings, the case in which a node is assigned to serve as an owner node is illustrated as "OWNER" or "O"; the case in which a node is assigned to serve as a backup node is illustrated as "BACKUP" or "B"; and the case in which a node is neither assigned to serve as an owner node nor assigned to serve as a backup node is illustrated as "NONE" or "N" or a blank space.

The next-role table stores therein the next role assigned to each of a plurality of nodes 30 with respect to each of a plurality of partitions. Thus, the next-role table specifies, with respect to each of a plurality of partitions, whether each of a plurality of nodes 30 is next assigned either to serve as an owner node, or to serve as a backup node, or neither to serve as an owner node nor to serve as a backup node. For example, when a failure occurs in a node 30 or when a new node 30 is added, then the current-role table is replaced with the next-role table.

As an example, as illustrated in FIG. 5, in the next-role table, the nodes 30 are identified by rows, while the partitions are identified by columns. In this case, the next-role table stores, in each cell having an intersection between a row and a column, the next role assigned to the node 30 identified by the row with respect to the partition identified by that column.

The target-role table stores therein an assigned role of a backup candidate node assigned to each of a plurality of nodes 30 with respect to each of a plurality of partitions. A backup candidate has a role to make preparations for serving the node 30 as an owner node or a backup node in future with respect to a partition. In the explanation of the present embodiment, although this particular role is named as "backup candidate", the node 30 assigned to serve as a backup candidate node can also serve as an owner node in future.

As an example, as illustrated in FIG. 6, in the target-role table, the nodes 30 are identified by rows, while the partitions are identified by columns. In this case, the target-role table stores, in each cell having an intersection between a row and a column, the role of a backup candidate node assigned to the node 30 identified by the row and assigned with respect to the partition identified by the column. In the drawings, the case in which a node is assigned to serve as a backup candidate node is illustrated as "MID-BACKUP" or "M"; and the case in which a node is not assigned to serve as a backup candidate node is illustrated as a blank space.

The first assigning unit 22 assigns, with respect to each of a plurality of partitions, the node 30 that would serve as the owner node and the node 30 that would serve as the backup node depending on the state of each of a plurality of nodes 30. Moreover, for example, if a failure occurs in any one node 30 of a plurality of nodes 30; then, with the exclusion of the node 30 in which a failure has occurred, the first assigning unit 22 reassigns the nodes 30 that would serve as the owner nodes and the nodes 30 that would serve as the backup nodes.

Furthermore, if a new node 30 is added; then, while including the newly added node 30, the first assigning unit 22 reassigns, with respect to each of a plurality of partitions, the node 30 that would serve as the owner node and the node 30 that would serve as the backup node. Moreover, in the case in which, due to the completion of sending the data pieces to a node 30 that is assigned to serve as a backup candidate node, the node 30 becomes newly available to serve as an owner node or a backup node; the first assigning unit 22 reassigns, with respect to each of a plurality of partitions, the node 30 that would serve as the owner node and the node 30 that would serve as the backup node.

Herein, regarding the nodes 30 assigned to serve as the owner nodes and the nodes 30 assigned to serve as the backup nodes, the first assigning unit 22 does the assignment with respect to all of a plurality of partitions in such a way that at least the owner nodes are present. With that, the first assigning unit 22 can at least make the database work.

Moreover, subject to at least making the database work, the first assigning unit 22 assigns, with respect to each of a plurality of partitions, the node 30 that would serve as the owner node and the node 30 that would serve as the backup node in such a way that the redundancy within a predetermined range is achieved. With that, even if a failure occurs in any one of the nodes 30, the first assigning unit 22 can increase the likelihood of at least making the database work.

Moreover, subject to at least making the database work as well as subject to achieving the redundancy within a predetermined range, the first assigning unit 22 assigns, with respect to each of a plurality of partitions, the node 30 that would serve as the owner node and the node 30 that would serve as the backup node in such a way that the owner nodes and the backup nodes are assigned in a distributed manner among a plurality of nodes 30. With that, the first assigning unit 22 can even out the processing load of each of a plurality of nodes 30.

Meanwhile, in the present example, in order to assign the nodes 30 that would serve as the owner nodes and the nodes 30 that would serve as the backup nodes, the first assigning unit 22 calculates the next-role table. Regarding an example of the method by which the first assigning unit 22 calculates the next-role table, the explanation is given later with reference to FIG. 16.

The second assigning unit 23 assigns, with respect to each of a plurality of partitions, the node 30 that would serve as the backup candidate node depending on the state of a plurality of nodes 30 and depending on the changes in the assignment state of the owner nodes and the backup nodes assigned according to the current-role table. Moreover, for example, if a failure occurs in any one node 30 of a plurality of nodes 30; then, with the exclusion of the node 30 in which a failure has occurred, the second assigning unit 23 reassigns the nodes 30 that would serve as the backup candidate nodes. Furthermore, if a new node 30 is added; then, while including the newly added node 30, the second assigning unit 23 reassigns, with respect to each of a plurality of partitions, the nodes 30 that would serve as the backup candidate nodes.

Herein, with respect to each of a plurality of partitions, the second assigning unit 23 assigns the node 30 that would serve as the backup candidate node in such a way that the redundancy within a predetermined range is achieved in future. With that, even if a failure occurs in any one node 30 in future, the second assigning unit 23 can increase the likelihood of at least making the database work.

Moreover, with respect to each of a plurality of partitions, the second assigning unit 23 assigns the node 30 that would serve as the backup candidate node in such a way that future assignment of the owner nodes and the backup nodes is done in a distributed manner among a plurality of nodes 30. With that, the second assigning unit 23 can even out the processing load of each of a plurality of nodes 30 in future.

Meanwhile, in the present example, in order to assign the nodes 30 that would serve as the backup candidate nodes, the second assigning unit 23 calculates the target-role table. Regarding an example of the method by which the second assigning unit 23 calculates the target-role table, the explanation is given later with reference to FIG. 17.

The cluster managing unit 24 communicates messages with each of a plurality of nodes 30 via a network, and manages each of a plurality of nodes 30. For example, at regular time intervals, the cluster managing unit 24 communicates a message called heartbeat to each of a plurality of nodes 30. Then, depending on whether or not a response to the heartbeat is received, the cluster managing unit 24 identifies the node 30 in which a failure has occurred.

Moreover, at regular intervals, the cluster managing unit 24 receives the data retention table from each of a plurality of nodes 30. Then, the cluster managing unit 24 stores, in the table memory unit 21, the data retention tables received from all of the nodes 30. Furthermore, depending on whether or not the data retention table is received, the cluster managing unit 24 identifies the node 30 in which a failure has occurred.

Moreover, at the time of startup, the cluster managing unit 24 causes the first assigning unit 22 to calculate the next-role table and distributes the calculated next-role table to each of a plurality of nodes 30, to thereby instruct each of a plurality of nodes 30 to perform operations according to the assignment. The cluster managing unit 24 causes the first assigning unit 22 on a periodic basis to calculate the next-role table. In the case when the calculated next-role table changes from the current-role table, the cluster managing unit 24 distributes the calculated next-role table to each of a plurality of nodes 30 to thereby instruct each of a plurality of nodes 30 to perform operations according to the assignment. Once the next-role table is distributed; the cluster managing unit 24 updates the current-role table, which is stored in the table memory unit 21, with the contents of the next-role table.

For example, if a failure occurs in any one node 30, or if a new node 30 is added, or if sending of the data pieces to a node 30 that is assigned to serve as a backup candidate node is completed and that node 30 becomes newly available for assignment as a backup node; then the calculated next-role table changes from the current-role table. Accordingly, in such a case, the cluster managing unit 24 distributes the next-role table to each of a plurality of nodes 30.

Meanwhile, the cluster managing unit 24 causes the second assigning unit 23 on a periodic basis to calculate the target-role table and distributes the calculated target-role table to each of a plurality of nodes 30. By distributing the target-role table, the cluster managing unit 24 instructs each of the nodes 30 to make preparations for causing the node 30 assigned to serve as the backup candidate node to operate as the owner nodes or the backup nodes. Meanwhile, the cluster managing unit 24 instructs calculation of the next-role table and calculation of the target-role table at different cycles.

Each of a plurality of nodes 30 includes a data storing unit 31, a table memory unit 32, an access processing unit 33, a node managing unit 34, and a transferring unit 35. The access processing unit 33, the node managing unit 34, and the transferring unit 35 are implemented when the CPU 12 of the corresponding node 30 runs programs. Alternatively, the access processing unit 33, the node managing unit 34, and the transferring unit 35 can be implemented either partially or entirely using hardware circuitry. The data storing unit 31 and the table memory unit 32 are implemented using the memory 13 of the corresponding node 30 or the external memory device 16.

Figure 7:
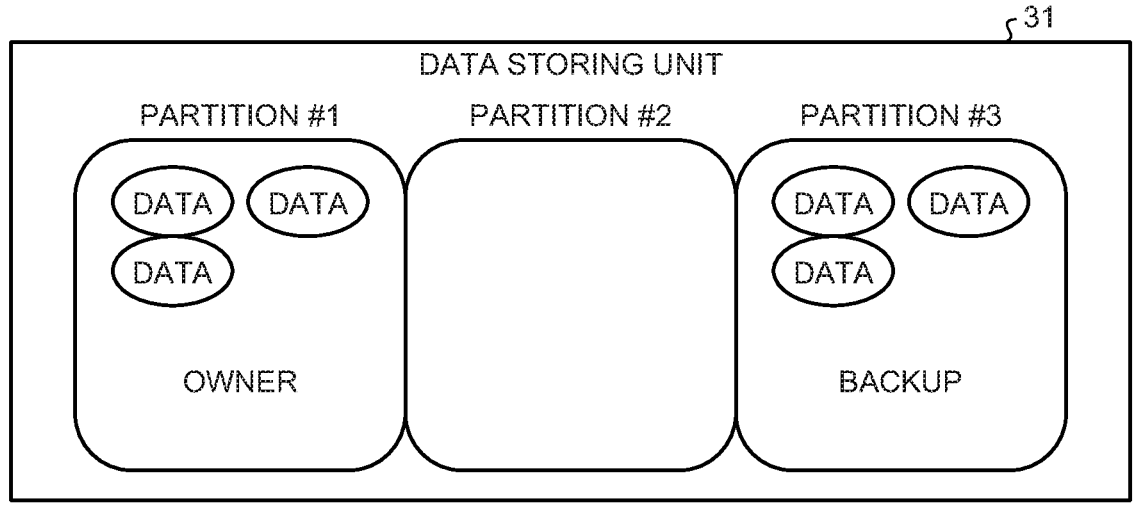
FIG. 7 is a diagram illustrating an example of data pieces stored in a data storing unit.

The data storing unit 31 is used to store the data pieces of the partitions, from among a plurality of partitions obtained by partitioning the database, with respect to which the node is assigned to serve as the owner node or the backup node. For example, as illustrated in FIG. 7, from among three partitions #1 to #3 obtained by partitioning the database, assume that the concerned node is assigned to serve as the owner node with respect to the partition #1 and assigned to serve as the backup node with respect to the partition #3. In this case, the corresponding data storing unit 31 stores the data pieces of the partition #1 and the data pieces of the partition #3.

Regarding a partition for which a node 30 is assigned to serve as the backup candidate node according to the target-role table, that node 30 receives the data pieces from another node 30 which is assigned to serve as the owner node with respect to the partition. Regarding the data pieces present in a partition for which the concerned node is assigned to serve as the backup candidate node according to the target-role table, the corresponding data storing unit 31 stores therein some or all of the data that is already received from the node 30 serving as the owner node with respect to the partition.

Furthermore, the data storing unit 31 stores a snapshot and an operation log for each partition. The snapshot is a static image of data pieces in a partition at a certain time. The data pieces are divided, for example, into fixed-length data portions called chunks. The snapshot is the data of data pieces written by a unit of, for example, a chunk. The data storing unit 31 generates a snapshot in response to instruction given by the transferring unit 35. The data storing unit 31 stores the snapshot in a region in the memory 13. Thus, the data storing unit 31 can generate and store the snapshot within a relatively short time after receiving instruction from external.

The operation log is the data representing the change in data which is made for data pieces in a partition according to an access request for updating or registering given by a client. The operation log is generated for each access request for updating or registering, and is associated with a time stamp and stored. Thus, based on the image of data pieces at the first point of time and the operation log from the first point of time to the second point of time, the image of data pieces at the second point of time can be restored. The data storing unit 31 stores operation logs obtained within a predetermined time period, and sequentially deletes the stored operation log after a predetermined time period has elapsed.

The table memory unit 32 is used to store the portion in the data retention table which corresponds to the corresponding node. Besides, the table memory unit 32 is used to store the current-role table, the next-role table, and the target-role table. Regarding the current-role table; when the next-role table is received, the current-role table is replaced with the next-role table. Regarding the target-role table; when there is a change in the target-role table received on a periodic basis, it is rewritten with the changed contents.

The access processing unit 33 receives an access request from a client via a network. Then, with respect to each of a plurality of partitions, the access processing unit 33 performs operations according to the role assigned to the corresponding node in the current-role table.

More particularly, the access processing unit 33 receives from a client an access request with respect to the partition for which the corresponding node is assigned in the current-role table to serve as the owner node; and performs operations according to that access request. As an example, when a reference request is received, the access processing unit 33 reads the corresponding data from the data pieces in the partition, and sends the read data to the client. Moreover, as an example, when an update request is received, the access processing unit 33 updates the corresponding data in the data pieces in the partition. Furthermore, as an example, when a registration request is received, the access processing unit 33 registers new data in the data pieces in the partition.

Meanwhile, the access processing unit 33 can also receive a transaction that contains a sequence of access requests. In that case, the access processing unit 33 performs transaction processing to process the sequence of access requests received from a client.

Moreover, when an update request or a registration request is processed, the access processing unit 33 performs a replication operation with the node 30 that is assigned in the current-role table to serve as the backup node with respect to the concerned partition. A replication operation points to an operation of generating, in the node 30 that is assigned to serve as the backup node, a replica of the data pieces stored in the node 30 that is assigned to serve as the owner node.

Figure 8:
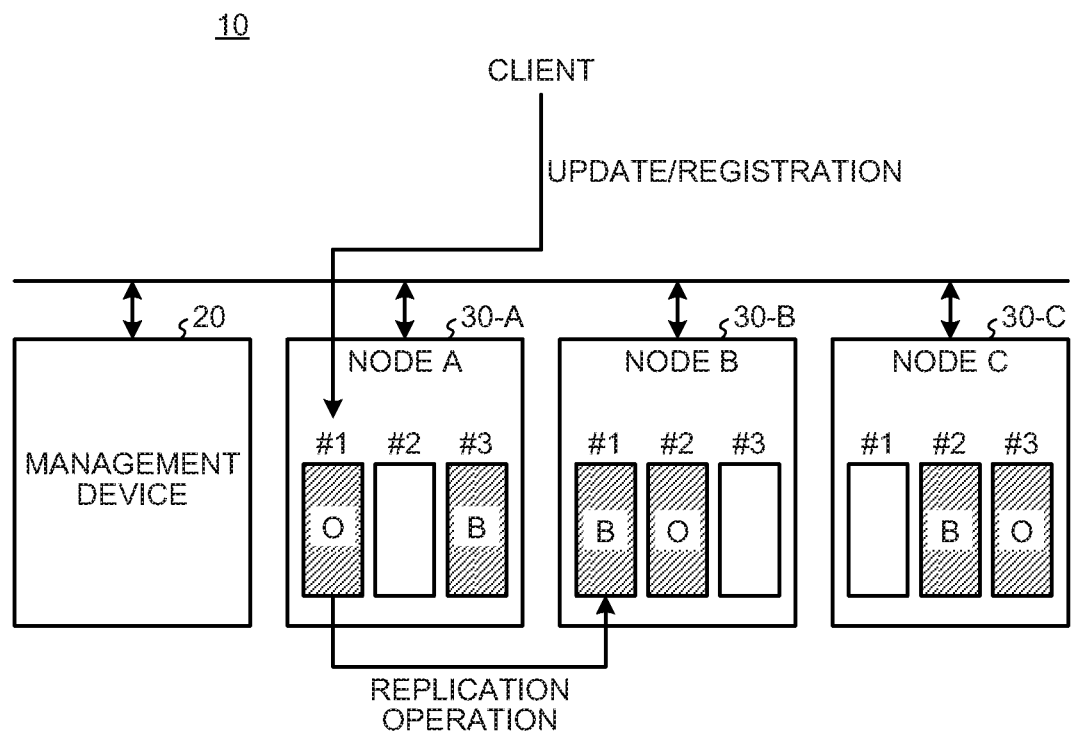
FIG. 8 is a diagram for explaining a replication application.

More particularly, as illustrated in FIG. 8, when an update request or a registration request is received with respect to a partition for which the corresponding node is assigned to serve as the owner node, the access processing unit 33 sends an identical access request to another node 30 that is assigned to serve as the backup node. Then, the access processing unit 33 of the other node 30 receives, from the node 30 assigned to serve as the owner node, an update request or a registration request with respect to the partition for which the corresponding node 30 is assigned to serve as the backup node; and performs an update operation or a registration operation according to the received request.

By performing such a replication operation, the access processing unit 33 can achieve synchronization of data pieces between the node 30 assigned to serve as the owner node and the node 30 assigned to serve as the backup node.

In the case in which the replication operation is performed by the access processing unit 33 of the node 30 that is assigned to serve as the owner node, the access processing unit 33 can also send the transaction that contains a sequence of access requests. In this case, in the node 30 that is assigned to serve as the backup node, the access processing unit 33 performs a replication operation by means of transaction processing.

Meanwhile, when an update request or a registration request is processed, the access processing unit 33 updates the time stamp of the corresponding partition in the data retention table that is stored in the table memory unit 32.

The node managing unit 34 communicates messages with the cluster managing unit 24 of the management device 20 via a network. Upon receiving a message called heartbeat from the cluster managing unit 24, the node managing unit 34 sends back a response message in case a failure has occurred in the corresponding node. Moreover, the node managing unit 34 sends the data retention table, which is stored in the table memory unit 32, to the cluster managing unit 24 on a periodic basis.

Furthermore, the node managing unit 34 receives the next-role table from the cluster managing unit 24, and stores the next-role table in the table memory unit 32. Herein, upon receiving the next-role table, as illustrated in FIG. 9, the node managing unit 34 performs short-term synchronization processing that is a synchronization processing in which the operations being performed according to the access request received from a client are temporarily discontinued for the purpose of making each of a plurality of nodes 30 operate according to the role assigned in the next-role table.

More particularly, with respect to each of a plurality of partitions, the node managing unit 34 causes the access processing unit 33 to perform an identical operation to the replication operation for the purpose of making each of a plurality of nodes 30 operate according to the role assigned in the next-role table. As a result, with respect to each of a plurality of partitions, the node managing unit 34 can achieve synchronization of data pieces between the node 30 assigned to serve as the owner node and the node 30 assigned to serve as the backup node. Upon achieving synchronization of data pieces, the node managing unit 34 causes the access processing unit 33 to rewrite the current-role table with the contents of the next-role table and to perform operations with respect to each of a plurality of partitions according to the new roles assigned in the next-role table.

Once the short-term synchronization processing is completed, the node managing unit 34 updates the contents of the current-role table with the contents of the next-role table. After that, the access processing unit 33 can receive an access request from a client.

The node managing unit 34 receives the target-role table from the cluster managing unit 24 on a periodic basis, and stores that target-role table in the table memory unit 32.

Figure 10:
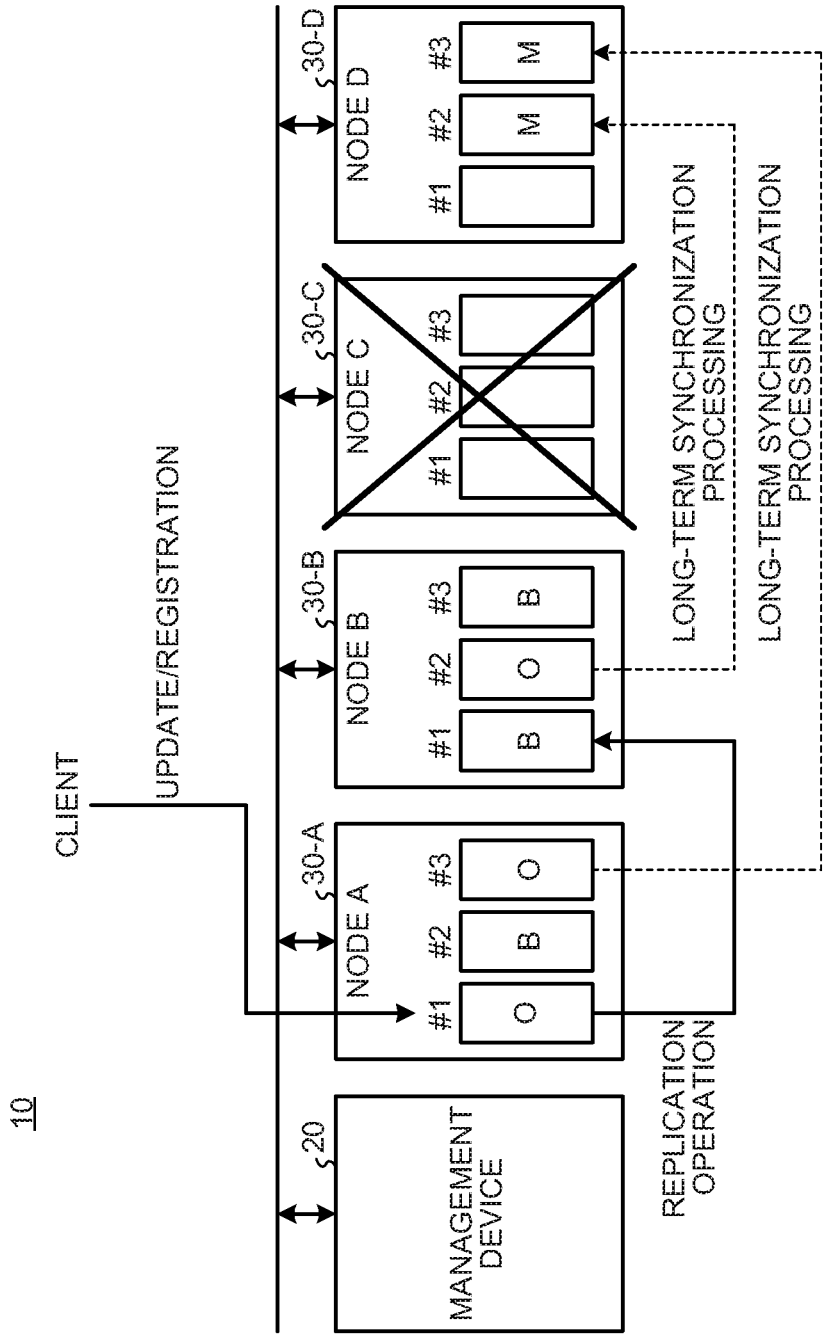
FIG. 10 is a diagram for explaining long-term synchronization processing.

As illustrated in FIG. 10, the transferring unit 35 performs long-term synchronization processing that is a synchronization processing for the purpose of making each of a plurality of nodes 30 operate in the role assigned in the next-role table without discontinuing the operations being performed according to the access request received from a client. More particularly, the transferring unit 35 sends, without discontinuing the operations being performed according to the access request, the data pieces of the partition, for which the corresponding node is assigned to serve as the owner node according to the current-role table, to the other node 30 that is assigned to serve as the backup candidate node according to the target-role table and that is neither assigned to serve as the owner node nor assigned to serve as the backup node. Moreover, the transferring unit 35 sends, without discontinuing the operations being performed according to the access request, the data pieces of the partition, for which the corresponding node is assigned to serve as the backup candidate node according to the target-role table and for which the corresponding node is neither assigned to serve as the owner node nor assigned to serve as the backup node according to the current-role table, from the other node 30 that is assigned to serve as the owner node according to the current-role table.

By performing such long-term synchronization processing, a replica of the data pieces, which are stored in the node 30 that is assigned to serve as the owner node, can be stored by the transferring unit 35 in the node 30 that is not assigned to serve as the owner node or the backup node. As a result, upon the completion of the long-term synchronization processing, the transferring unit 35 can newly generate a node 30 that can serve as the owner node or the backup node.

Figure 11:
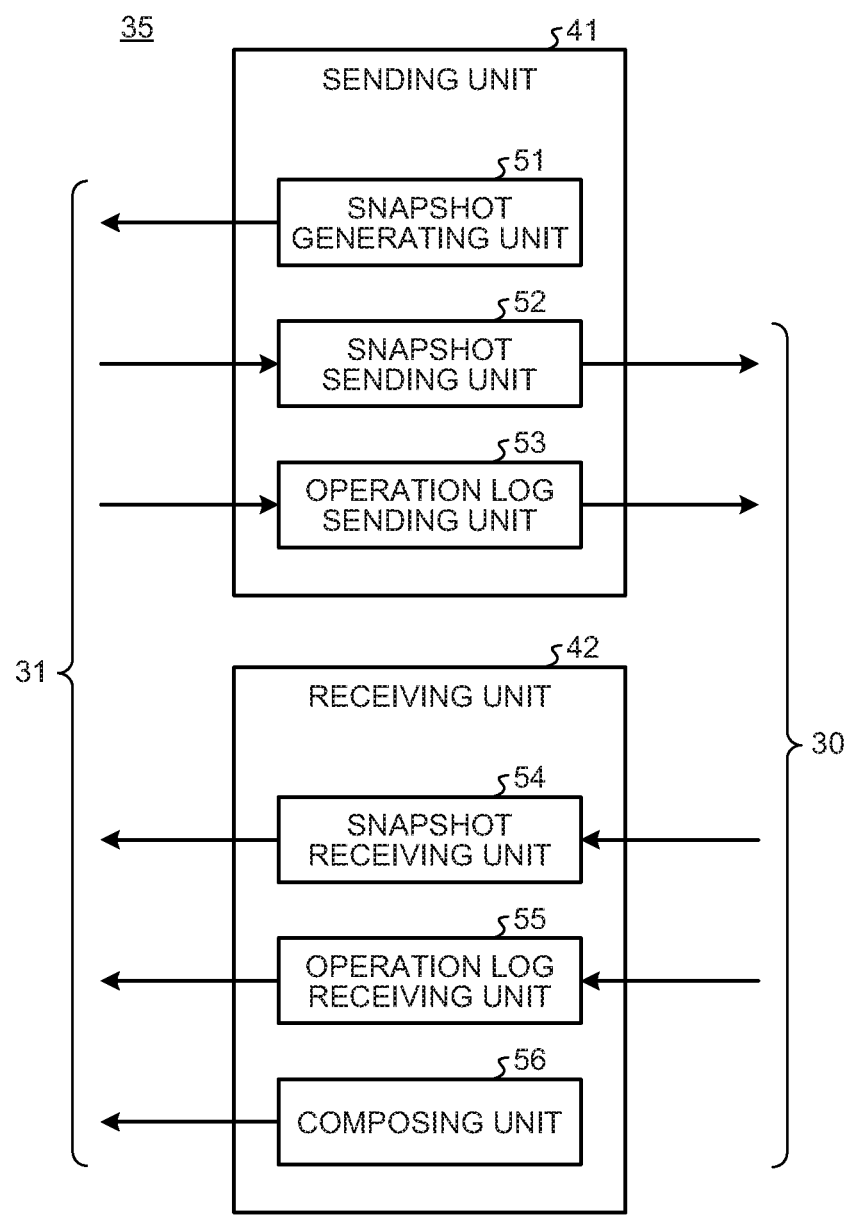
FIG. 11 is a diagram illustrating a configuration of a transferring unit.

FIG. 11 is a diagram illustrating the configuration of the transferring unit 35. The transferring unit 35 includes a sending unit 41 and a receiving unit 42. The sending unit 41 includes a snapshot generating unit 51, a snapshot sending unit 52, and an operation log sending unit 53.

Figure 12:
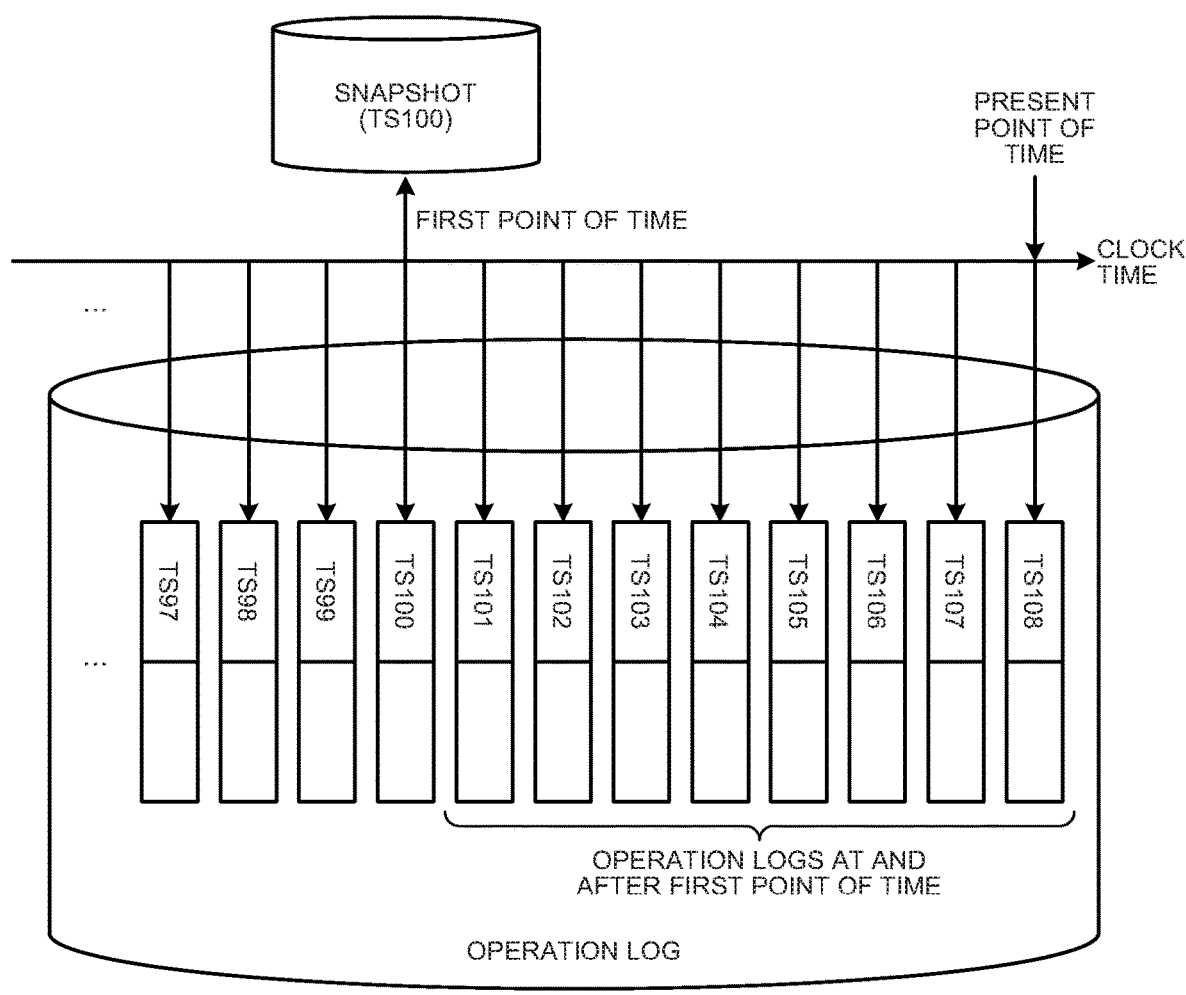
FIG. 12 is a diagram illustrating an example of timings at which a snapshot and operation logs are generated.

For example, as illustrated in FIG. 12, the snapshot generating unit 51 generates in the data storing unit 31 a snapshot, at the first point of time (such as the point of time at TS100), of data pieces in the partition for which a corresponding node is assigned according to the current-role table to serve as the owner node. The snapshot sending unit 52 sends the snapshot generated in the data storing unit 31 to another node 30 that is assigned to serve as the backup candidate node according to the target-role table and that is neither assigned to serve as the owner node nor assigned to serve as the backup node according to the current-role table.

Figure 13:
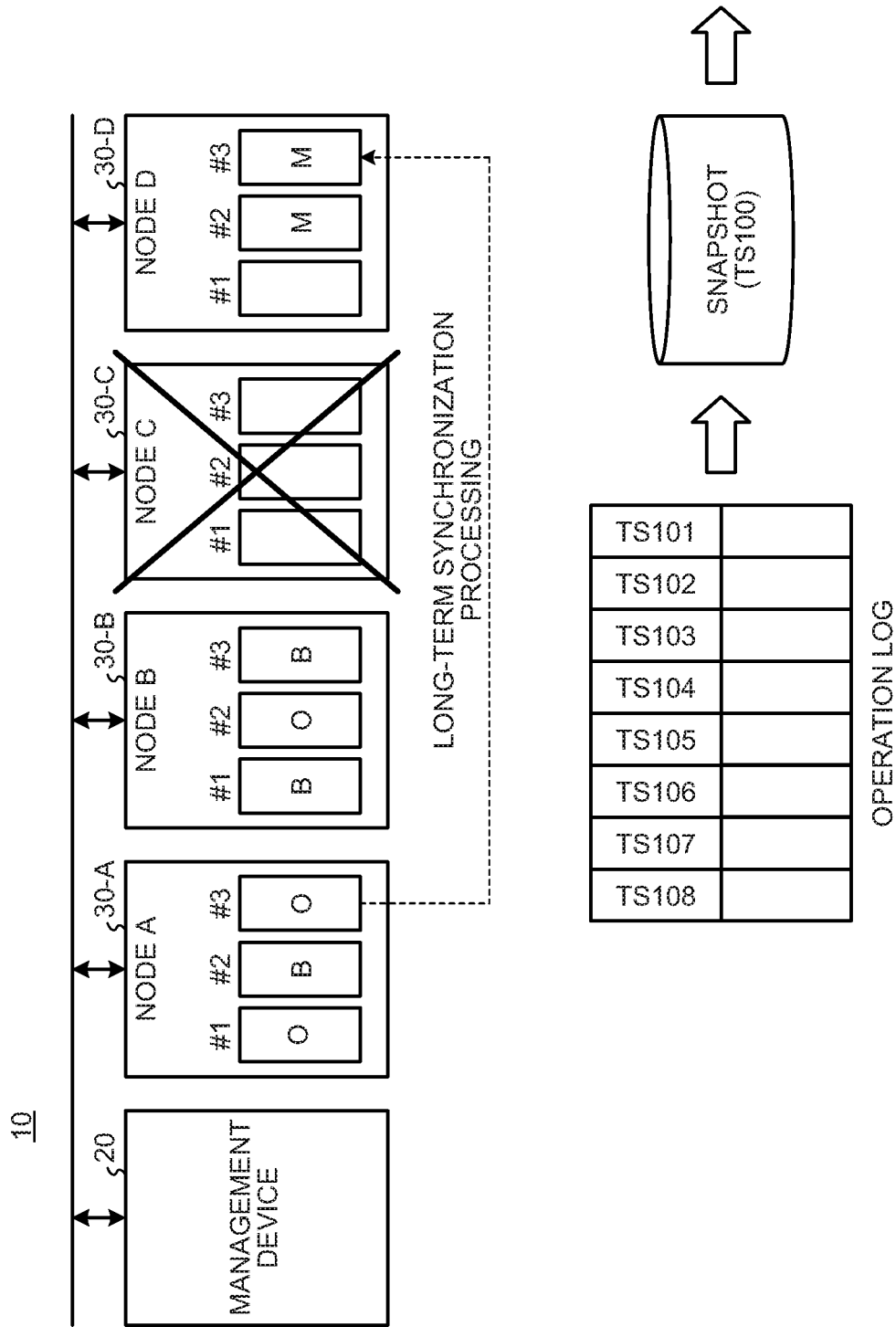
FIG. 13 is a diagram illustrating an order of sending the snapshot and the operation log.

Furthermore, as illustrated in FIG. 12, the operation log sending unit 53 obtains, from the data storing unit 31, operation logs at and after the first point of time (for example, operation logs from TS101 to TS108) according to access requests with respect to the data pieces in the partition for which the corresponding node is assigned according to the current-role table to serve as the owner node. The operation log sending unit 53 then sends the obtained operation logs to another node 30 that is assigned to serve as the backup candidate node according to the target-role table and that is neither assigned to serve as the owner node nor assigned to serve as the backup node according to the current-role table. In this case, as illustrated in FIG. 13, the snapshot sending unit 52 and the operation log sending unit 53 first send the snapshot and then send the operation log after sending of the snapshot is completed.

Furthermore, the receiving unit 42 includes a snapshot receiving unit 54, an operation log receiving unit 55, and a composing unit 56.

The snapshot receiving unit 54 receives a snapshot, at the first point of time, of data pieces in the partition, for which the corresponding node is assigned to serve as the backup candidate node according to the target-role table and is neither assigned to serve as the owner node nor assigned to serve as the backup node according to the current-role table, from another node 30 that is assigned to serve as the owner node of the partition according to the current-role table. The snapshot receiving unit 54 stores the snapshot in the data storing unit 31. The operation log receiving unit 55 receives the operation logs at and after the first point of time according to access requests with respect to the data pieces in the partition, that is assigned to serve as the backup candidate node according to the target-role table and that is neither assigned to serve as the owner node nor assigned to serve as the backup node according to the current-role table, from another node 30 that is assigned to serve as the owner node of the partition according to the current-role table. The operation log receiving unit 55 stores the operation logs in the data storing unit 31.

The composing unit 56 reflects the updated logs at and after the first point of time stored in the data storing unit 31 on the snapshot at the first point of time stored in the data storing unit 31, so as to generate an image of data pieces at the present point of time in the partition assigned to the owner according to the current-role table. Thus, the transferring unit 35 can store a replica of the data pieces stored in the node 30 assigned to serve as the owner node in a node 30 that is neither assigned to serve as the owner node nor assigned to serve as the backup node.

In the case of performing long-term synchronization processing, the transferring unit 35 sends, in the background while not interrupting the transaction execution by the access processing unit 33, the data pieces of the partition for which the corresponding node is assigned to serve as the owner node to the node 30 that is assigned to serve as the backup candidate node. Moreover, the transferring unit 35 receives, in the background, the data pieces of the partition for which the corresponding node is assigned to serve as the backup candidate node from the node 30 that is assigned to serve as the owner node. Herein, regarding an operation performed in the background; as an example, when the node 30 includes a plurality of CPUs 12, an operation performed using some of the CPUs 12 not performing the transaction operation represents an operation performed in the background. Alternatively, regarding an operation performed in the background; as an example, when the CPU 12 performs operations in a time-shared manner, an operation performed in some of the time slots in which the CPU 12 does not perform the transaction operation represents an operation performed in the background.

While the transferring unit 35 is sending the snapshot and the operation log of the data pieces, the access processing unit 33 reduces the speed of a registering and updating operation according to an access request from a client to a speed lower than a predetermined speed. For example, the access processing unit 33 sets the priority of a resource that performs an operation for the transferring unit 35 (for example, a CPU 12, a thread, or a process) to be higher than a referential set value to increase the throughput per unit time of the processing performed by the transferring unit 35. Furthermore, for example, the access processing unit 33 sets a registering and updating operation according to an access request from a client to sleep (for example, temporarily stop) for a predetermined time period. In this manner, the transferring unit 35 can surely perform the long-term synchronization processing.

Meanwhile, regarding the data pieces of the partition for which the corresponding node is assigned to serve as the backup node according to the current-role table, the transferring unit 35 can send those data pieces to the other node 30 that is assigned to serve as the backup candidate node according to the target-role table and that is neither assigned to serve as the owner node nor assigned to serve as the backup node according to the target-role table. In this case, the transferring unit 35 performs operations conditional upon the fact that the same data pieces have not been sent from another node 30.

Figure 14:
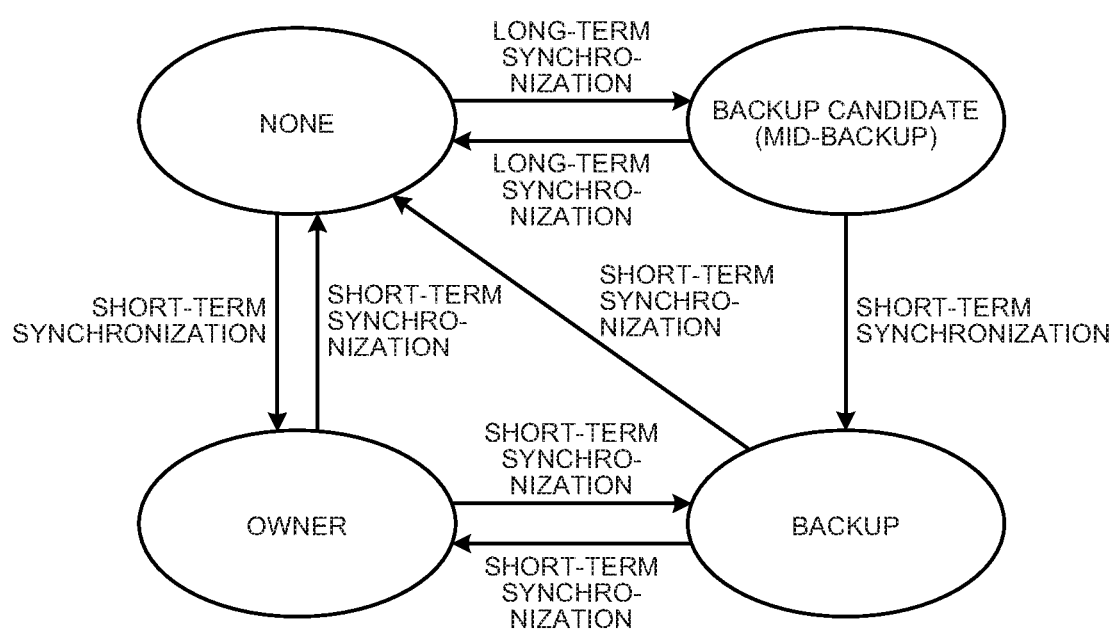
FIG. 14 is a diagram illustrating transition in roles assigned to nodes.

FIG. 14 is a diagram illustrating a transition in the roles assigned to the nodes 30. With respect to each of a plurality of partitions, the nodes 30 make transition between the state of being assigned to serve as the "owner node", or the state of being assigned to serve as the "backup node", or the state of being assigned to serve as the "backup candidate node", or the state of being assigned "no role".

A node 30 makes mutual transition between the state of being assigned "no role" and the state of being assigned to serve as the "owner node" as a result of short-term synchronization processing. Similarly, a node 30 makes mutual transition between the state of being assigned to serve as the "owner node" and the state of being assigned to serve as the "backup node" as a result of short-term synchronization processing. Moreover, a node 30 makes mutual transition between the state of being assigned to serve as the "backup node" and the state of being assigned "no role" as a result of short-term synchronization processing.

Furthermore, a node 30 makes mutual transition between the state of being assigned "no role" and the state of being assigned to serve as the "backup candidate node" as a result of long-term synchronization processing. Besides, a node 30 makes transition from the state of being assigned to serve as the "backup candidate node" to the state of being assigned to serve as the "backup node" as a result of short-term synchronization processing.

Figure 15:
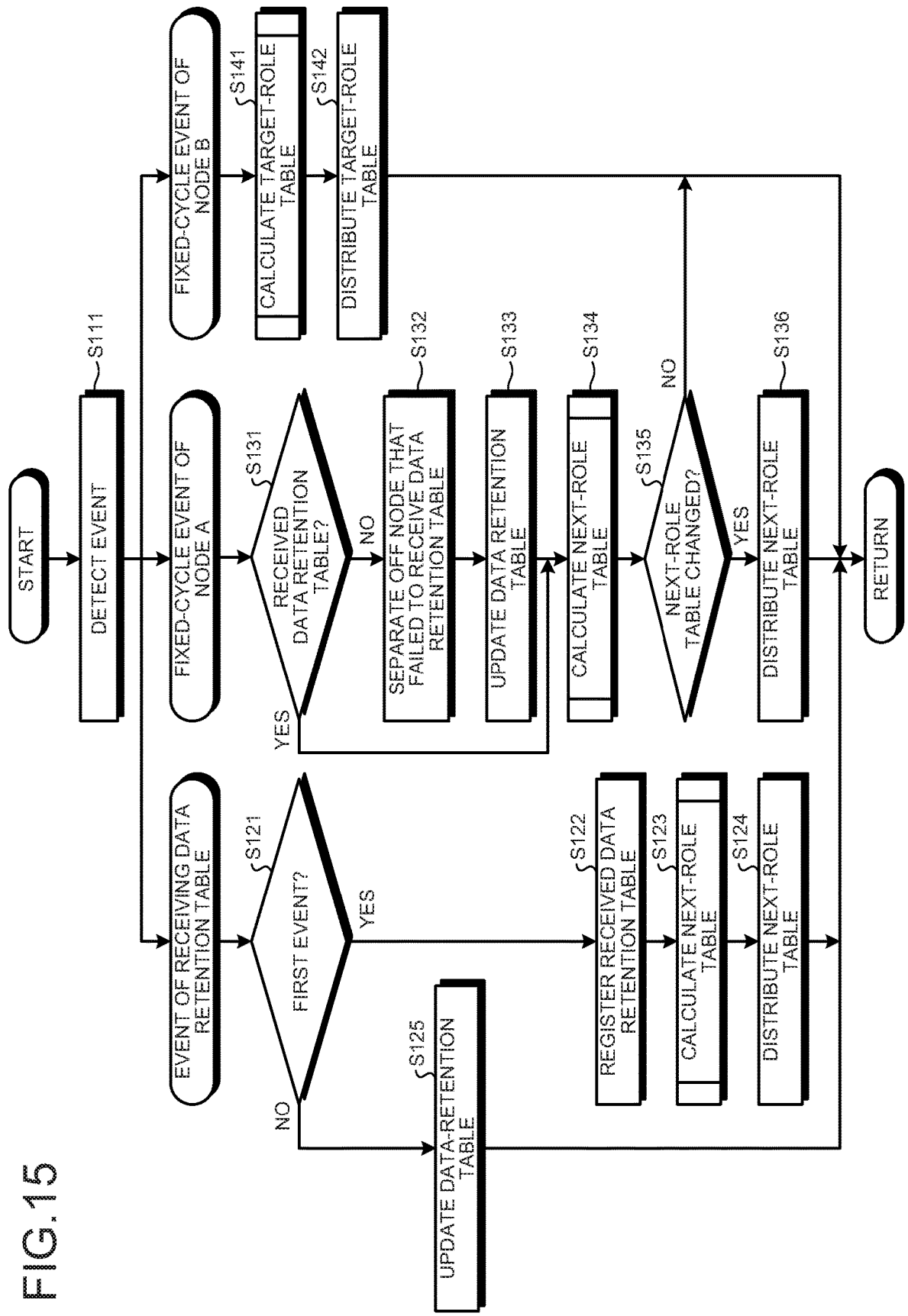
FIG. 15 is a diagram for explaining an operation flowchart of a cluster managing unit of a management device.

FIG. 15 is a diagram illustrating an operation flowchart of the cluster managing unit 24 of the management device 20. The cluster managing unit 24 performs operations from Step S111 to Step S142 explained below.

Firstly, at Step S111, the cluster managing unit 24 detects a data-retention-table receive event, a first fixed-cycle event, or a second fixed-cycle event. A data-retention-table receive event occurs when the cluster managing unit 24 receives the data retention table sent by each of a plurality of nodes 30. A first fixed-cycle event as well as a second fixed-cycle event occurs on a periodic basis. However, the interval of occurrence of the first fixed-cycle events is different from the interval of occurrence of the second fixed-cycle events.

When a data-retention-table receive event is detected, the cluster managing unit 24 proceeds to the operation at Step S121. When a first fixed-cycle event is detected, the cluster managing unit 24 proceeds to the operation at Step S131. When a second fixed-cycle event is detected, the cluster managing unit 24 proceeds to the operation at Step S141.

When a data-retention-table receive event is detected; at Step S121, the cluster managing unit 24 determines whether or not a data-retention-table receive event has occurred for the first time since the startup.

If the data-retention-table receive event has occurred for the first time since the startup (Yes at Step S121), then the cluster managing unit 24 proceeds to the operation at Step S122. At Step S122, the cluster managing unit 24 registers the received data retention table in the table memory unit 21.

Then, at Step S123, the cluster managing unit 24 causes the first assigning unit 22 to calculate the next-role table. The operation by which the first assigning unit 22 calculates the next-role table is explained with reference to FIG. 16.

Subsequently, at Step S124, the cluster managing unit 24 distributes the next-role table to each of a plurality of nodes 30. Once the operation at Step S124 is completed, the cluster managing unit 24 returns to the operation at Step S111.

Meanwhile, if it is not the first time since the startup that the data-retention-table receive event has occurred (No at Step S121); then, at Step S125, the cluster managing unit 24 updates the data retention table stored in the table memory unit 21. Once the operation at Step S125 is completed, the cluster managing unit 24 returns to the operation at Step S111.

Meanwhile, if a first fixed-cycle event is detected; then, at Step S131, the cluster managing unit 24 determines whether or not, during the period between the previous first fixed-cycle event and the current first fixed-cycle event, the data retention table is received from each of a plurality of nodes 30. If the data retention table is received from each of a plurality of nodes 30 (Yes at Step S131), then the cluster managing unit 24 proceeds to the operation at Step S134. However, if the data retention table is not received from any one node 30 (No at Step S131), then the cluster managing unit 24 proceeds to the operation at Step S132.

At Step S132, the cluster managing unit 24 performs an operation to separate off the node 30, from which the data retention table could not be received, from the database system 10. Then, at Step S133, the cluster managing unit 24 updates the data retention table by deleting the contents of the separated node 30 from the data retention table. Once the operation at Step S133 is completed, the cluster managing unit 24 proceeds to the operation Step S134.

At Step S134, the cluster managing unit 24 causes the first assigning unit 22 to calculate the next-role table. Regarding the operations by which the first assigning unit 22 calculates the next-role table, the explanation is given later with reference to FIG. 16.

Subsequently, at Step S135, the cluster managing unit 24 determines whether or not there is a change in the next-role table. For example, when a node 30 in which a failure has occurred is separated off, or when a new node 30 is added, or when long-term synchronization processing is completed and there is a change in the node 30 assigned to serve as the backup node; the next-role table undergoes a change.

If the next-role table has not changed (No at Step S135), then the cluster managing unit 24 returns to the operation at Step S111. However, when there is a change in the next-role table (Yes at Step S135); then, at Step S136, the cluster managing unit 24 distributes the changed next-role table to each of a plurality of nodes 30. Once the operation at Step S136 is completed, the cluster managing unit 24 returns to the operation at Step S111.

Meanwhile, when a second fixed-cycle event is detected; then, at Step S141, the cluster managing unit 24 causes the second assigning unit 23 to calculate the target-role table. Regarding the operations by which the second assigning unit 23 calculates the target-role table, the explanation is given later with reference to FIG. 17.

Subsequently, at Step S142, the cluster managing unit 24 distributes the calculated target-role table to each of a plurality of nodes 30. Once the operation at Step S142 is completed, the cluster managing unit 24 returns to the operation at S111.

Figure 16:
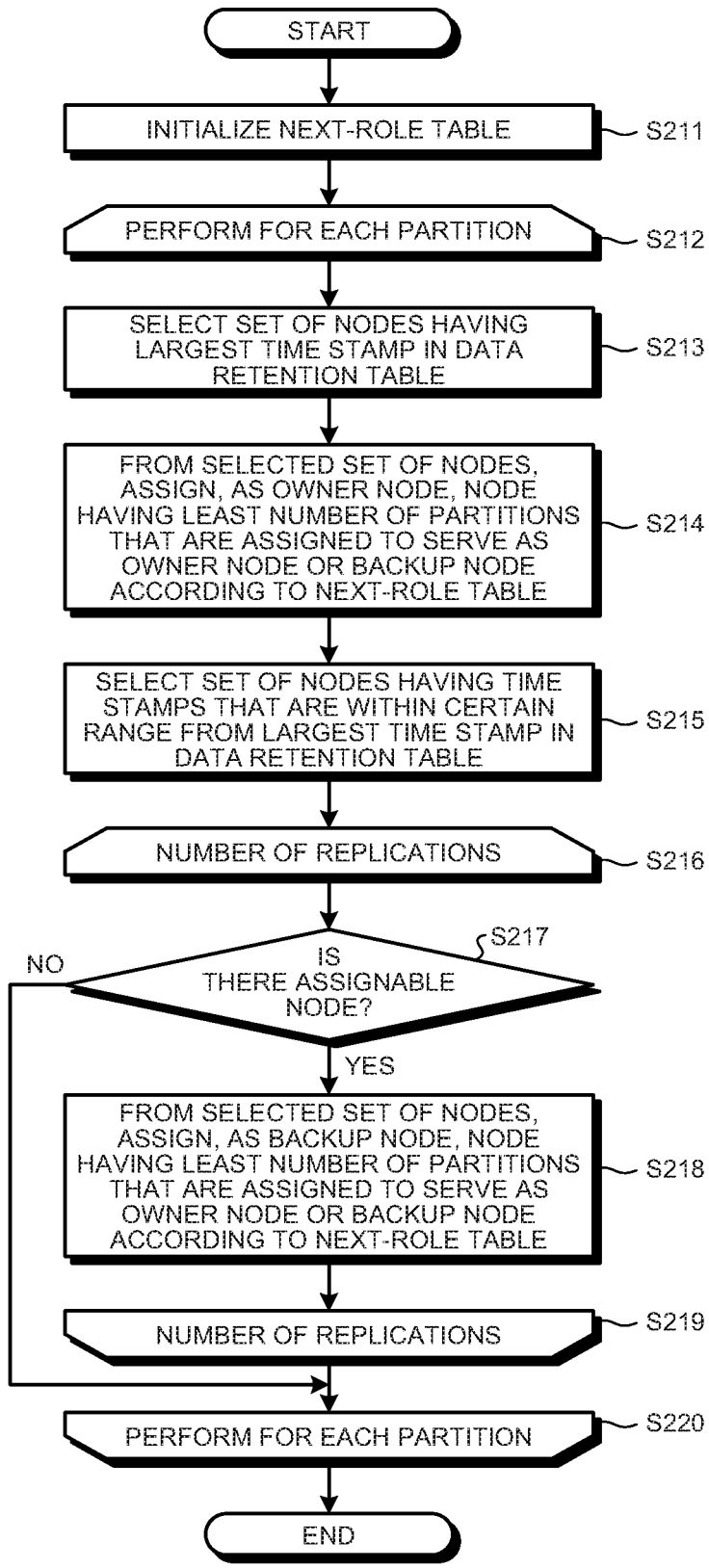
FIG. 16 is a flowchart for explaining the operations by which a first assigning unit of the management device calculates the next-role table.

FIG. 16 is a flowchart for explaining the operations by which the first assigning unit 22 of the management device 20 calculates the next-role table. The first assigning unit 22 is called by the cluster managing unit 24 at Step S123 and Step S134 illustrated in FIG. 15, and performs the operations from Step S211 to Step S220 explained below.

Firstly, at Step S211, the first assigning unit 22 initializes the next-role table. At that time, the first assigning unit 22 associates each of a plurality of nodes 30 specified in the next-role table with the nodes 30 specified in the data retention table. With that, in the next-role table, the first assigning unit 22 can reflect the node 30 that has been separated off due to a failure and the node 30 that has been newly added.

Then, from Step S212 to Step S220, the first assigning unit 22 performs a loop operation on a partition-by-partition basis. For example, if the database is partitioned into a first partition to a third partition, then the first assigning unit 22 performs the operations from Step S212 to Step S220 with respect to each of the first partition, the second partition, and the third partition.

In the loop operation performed on a partition-by-partition basis, firstly, at Step S213, the first assigning unit 22 selects, for the target partition, the set of nodes 30 having the largest time stamp specified in the data retention table. In this example, a time stamp is a value that is incremented after every instance of updating the data pieces of the target partition. Thus, at Step S213, the first assigning unit 22 can select, for the target partition, the set of nodes 30 in which the latest data pieces are stored.

Then, at Step S214, from the set of nodes 30 selected at Step S213, the first assigning unit 22 selects a single node 30 that is assigned to serve as the owner node and the backup node for the least number of partitions according to the next-role table; and assigns the selected node 30 to serve as the owner node. With that, from among the set of nodes 30 in which the latest data pieces are stored, the first assigning unit 22 can assign the node 30 having the least load as the owner node.

Meanwhile, if more than one node 30 is assigned to serve as the owner node and the backup node for the least number of partitions, then the first assigning unit 22 can assign a node 30 having a higher computing power to serve as the owner node on a priority basis as compared to a node 30 having a lower computing power. Alternatively, the first assigning unit 22 can assign a node 30 receiving a smaller number of access requests to serve as the owner node on a priority basis as compared to a node 30 receiving a greater number of access requests.

Subsequently, at Step S215, for the target partition, the first assigning unit 22 selects such a set of nodes 30 that does not include the node 30 assigned to serve as the owner node but that includes the nodes 30 having respective time stamps within a predetermined difference from the largest time stamp. With that, for the target partition, the first assigning unit 22 can select a set of nodes 30 in which either the latest data pieces are stored or the data pieces relatively closer to the latest data pieces are stored.

Then, from Step S216 to Step S219, the first assigning unit 22 performs a loop operation for a number of times equal to the number of replications. Herein, the number of replications represents the largest number of nodes 30 for which the replication operation can be performed with the node 30 that is assigned to serve as the owner node. Thus, the number of replications is identical to the number of assignable backup nodes.

In the loop operation performed for a number of times equal to the number of replications; firstly, at Step S217, from the set of nodes 30 selected at Step S215, the first assigning unit 22 determines whether or not there is a node 30 which can be assigned to serve as the backup node. If there is a node 30 which can be assigned to serve as the backup node (Yes at Step S217), then the first assigning unit 22 proceeds to the operation at Step S218.

On the other hand, if there is no node 30 which can be assigned as the backup node (No at Step S217), then the first assigning unit 22 mandatorily exits the loop operation performed for a number of times equal to the number of replications, and proceeds to the operation at Step S220. In view of that, sometimes the first assigning unit 22 calculates the next-role table in which the backup nodes are not present or in which the number of backup nodes is smaller than the number of replications.

At Step S218, from among the set of nodes 30 selected at Step S215, the first assigning unit 22 assigns, as the backup node, the node 30 that is assigned to serve as the owner node and the backup node for the least number of partitions according to the next-role table. With that, from among the set of nodes 30 in which either the latest data pieces are stored or the data pieces relatively closer to the latest data pieces are stored, the first assigning unit 22 can assign the nodes 30 to serve as the backup nodes in ascending order of the processing load.

Meanwhile, if more than one node 30 is assigned to serve as the owner node and the backup node for the least number of partitions, then the first assigning unit 22 can assign a node 30 having a higher computing power to serve as the backup node on a priority basis as compared to a node 30 having a lower computing power. Alternatively, the first assigning unit 22 can assign a node 30 receiving a smaller number of access requests to serve as the backup node on a priority basis as compared to a node 30 receiving a greater number of access requests.

Subsequently, the first assigning unit 22 excludes, from the set of nodes 30, the node 30 assigned to serve as the backup node; and proceeds to the operation at Step S219. At Step S219, if the number of operations from Step S216 to Step S219 is smaller than the number of replications, then the first assigning unit 22 returns to the operation at Step S216. However, if the number of operations from Step S216 to Step S219 is equal to the number of replications, then the first assigning unit 22 proceeds to the operation at Step S220.

Then, at Step S220, if the operations from Step S212 to Step S220 are not yet performed with respect to all partitions, then the first assigning unit 22 returns to the operation at Step S216. When the operations from Step S212 to Step S220 are performed with respect to all partitions, the first assigning unit 22 ends the calculation of the next-role table and exits the present flowchart.

In this way, the first assigning unit 22 assigns the nodes 30 in such a way that each of a plurality of partitions has an owner node assigned thereto. With that, the first assigning unit 22 can at least make the database work. Along with that, the first assigning unit 22 assigns the nodes 30 in such a way that backup nodes are present to the extent possible. With that, the first assigning unit 22 can guarantee the redundancy of the database. Moreover, the first assigning unit 22 assigns the nodes 30 to serve as the owner nodes and the backup nodes in ascending order of the processing load. With that, the first assigning unit 22 can even out the processing load of each of a plurality of nodes 30.

Figure 17:
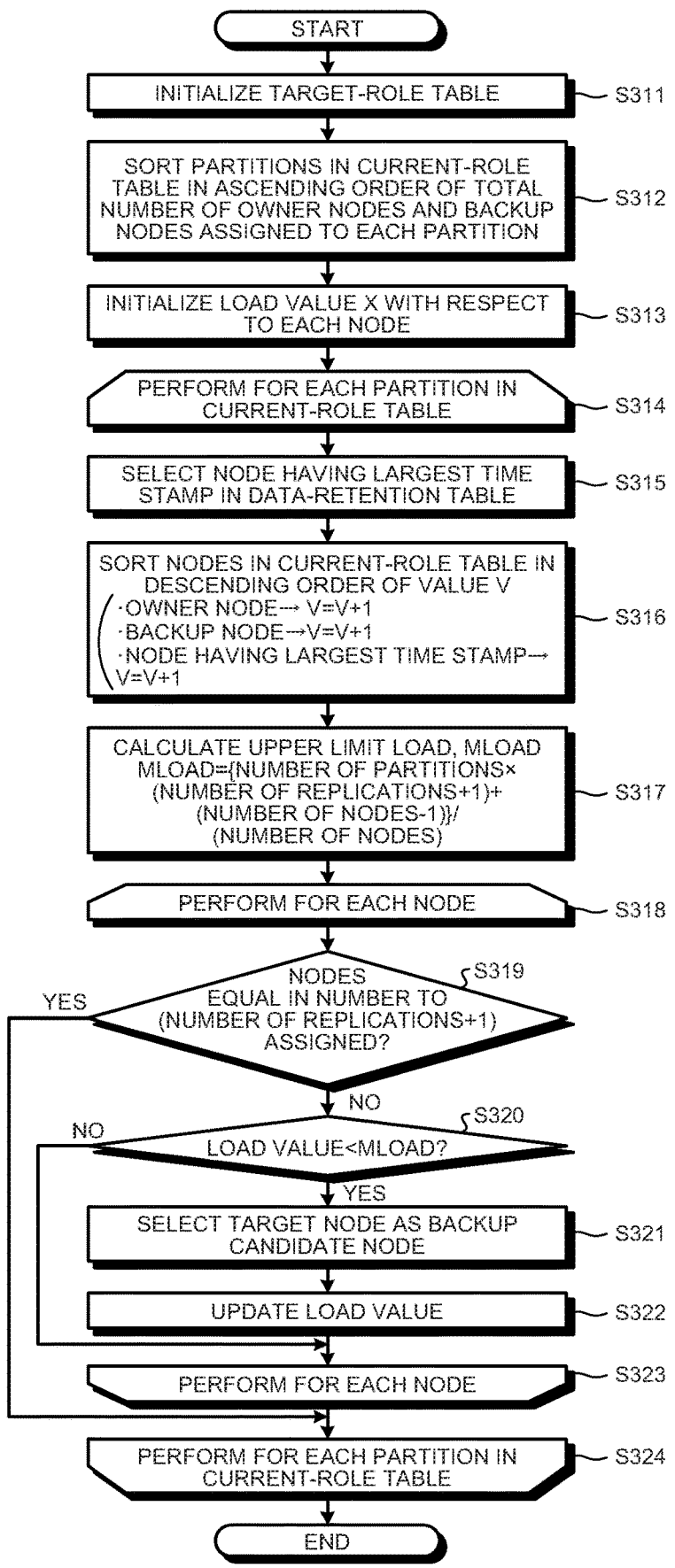
FIG. 17 is a flowchart for explaining the operations by which a second assigning unit of the management device calculates the target-role table.

FIG. 17 is a flowchart for explaining the operations by which the second assigning unit 23 of the management device 20 calculates the target-role table. The second assigning unit 23 is called by the cluster managing unit 24 at Step S141 illustrated in FIG. 15, and performs the operations from Step S311 to Step S324 explained below.

Firstly, at Step S311, the second assigning unit 23 initializes the target-role table. At that time, the second assigning unit 23 associates each of a plurality of nodes 30 specified in the target-role table with the nodes 30 specified in the data retention table. With that, in the target-role table, the second assigning unit 23 can reflect the node 30 that has been separated off due to a failure and the node 30 that has been newly added.

Then, at Step S312, the second assigning unit 23 sorts the partitions specified in the current-role table in ascending order of the total number of owner nodes and backup nodes assigned to each partition. With that, the second assigning unit 23 can assign the backup candidate nodes to the partitions in ascending order of the number of nodes 30 assigned to serve as the backup nodes for each partition. That is, in the current-role table, the second assigning unit 23 can assign the nodes 30 to serve as the backup candidate nodes to the partitions in ascending order of the redundancy of each partition.

Subsequently, at Step S313, the second assigning unit 23 initializes a load value with respect to each of a plurality of nodes 30. A load value is a value that increases in response to assigning the corresponding node 30 to serve as the backup candidate node. Herein, as an example, the second assigning unit 23 initializes each load value to "0".

Then, from Step S314 to Step S324, the second assigning unit 23 performs a loop operation on a partition-by-partition basis. In this case, the second assigning unit 23 selects the target partition in the order of partitions sorted in the current-role table at Step S312, and performs the loop operation.

In the loop operation performed on a partition-by-partition basis; firstly, at Step S315, the second assigning unit 23 selects, for the target partition, the node 30 having the largest time stamp specified in the data retention table.

Then, at Step S316, the second assigning unit 23 sorts the nodes 30 specified in the current-role table in descending order of values V. Herein, regarding the nodes 30 assigned to serve as the owner nodes, the value V is set to "+1". Regarding the nodes assigned to serve as the backup nodes, the value V is set to "+1". Regarding the nodes having the largest time stamp, the value V is set to "+1". Thus, regarding a node 30 that neither is an owner node nor is a backup node nor has the largest time stamp, the value V is equal to "0".

With that, as the nodes 30 that would serve as the backup candidate nodes, the second assigning unit 23 can firstly assign the nodes 30 that are assigned to serve as the owner nodes and the backup nodes or the nodes 30 in which the latest data pieces are stored.

Meanwhile, if more than one node 30 has the same value V, then the second assigning unit 23 arranges the nodes 30 having higher computing power near the top of the list so that they are assigned to serve as the backup candidate nodes on a priority basis. With that, the second assigning unit 23 can assign the nodes 30 to serve as the backup candidate nodes in such a way that a node 30 having a higher computing power serves as the owner node or the backup node on a priority basis as compared to a node 30 having a lower computing power. Alternatively, the second assigning unit 23 can arrange the nodes 30 receiving a smaller number of access requests near the top of the list so that they are assigned to serve as the backup candidate node on a priority basis. With that, the second assigning unit 23 can assign the nodes 30 to serve as the backup candidate nodes in such a way that a node 30 receiving a smaller number of access requests to serve as the owner node or the backup node on a priority basis as compared to a node 30 receiving a greater number of access requests.

Subsequently, at Step S317, the second assigning unit 23 calculates an upper limit load MLOAD, which is a constant number, using Equation (1) given below.

$$MLOAD = \{\text{number of partitions} \times (\text{number of replications}+1) + (\text{number of nodes}-1)\}/(\text{number of nodes}) \quad (1)$$

Herein, (number of replications+1) represents the maximum number of owner nodes and backup nodes that can be assigned to a single partition. The upper limit load MLOAD represents the upper limit standard of the number of partitions for which a single node 30 can be assigned to serve as the backup candidate node.

Subsequently, from Step S318 to Step S323, the second assigning unit 23 performs a loop operation for each node 30. In this case, the second assigning unit 23 selects the target node 30 according to the order of nodes specified in the current-role table after the sorting performed at Step S316, and performs the loop operation.

In the loop operation performed for each node 30; firstly, at Step S319, the second assigning unit 23 determines whether or not the nodes 30 equal in number to (number of replications+1) are assigned to serve as the backup candidate nodes. If the nodes 30 equal in number to (number of replications+1) are assigned to serve as the backup candidate nodes (Yes at Step S319), then the second assigning unit 23 proceeds to the operation at Step S324. In this case, with respect to the target partition, the second assigning unit 23 assigns the maximum number of nodes 30 to serve as the backup candidate nodes.

However, if the nodes 30 equal in number to (number of replications+1) are not assigned to serve as the backup candidate nodes (No at Step S319), then the second assigning unit 23 proceeds to the operation at Step S320.

At Step S320, the second assigning unit 23 determines whether the load value of the target node 30 is smaller than the upper limit load MLOAD. If the load value of the target node 30 is smaller than the upper limit load MLOAD (Yes at Step S320), then the second assigning unit 23 proceeds to the operation at Step S321.

On the other hand, if the load value of the target node 30 is equal to or greater than the upper limit load MLOAD (No at Step S320), then the second assigning unit 23 proceeds to the operation at Step S323. With that, in case a particular node 30 has been assigned to serve as the backup candidate node for a number of times equal to or greater than a reference value, the second assigning unit 23 can avoid assigning that node 30 anymore to serve as the backup candidate node. As a result, the second assigning unit 23 can assign, in a distributed manner, the roles of the backup candidate nodes to a plurality of nodes 30.

At Step S321, with respect to the target partition, the second assigning unit 23 assigns the target node 30 to serve as the backup candidate node. Then, at Step S322, the second assigning unit 23 updates the load value of the target node 30 by adding "1". With that, every time the node 30 is assigned to serve as the backup candidate node, the second assigning unit 23 can increment the load value by one. Once the operation at Step S322 is completed, the second assigning unit 23 proceeds to the operation at Step S323.

Then, at Step S323, if the operations from Step S318 to Step S323 are not yet performed for each of a plurality of nodes 30, then the second assigning unit 23 returns to the operation at Step S318. When the operations from Step S318 to Step S323 are performed for each of a plurality of nodes 30, the second assigning unit 23 proceeds to the operation at Step S324.

Subsequently, at Step S324, if the operations from Step S314 to Step S324 are not yet performed for each of a plurality of partitions, then the second assigning unit 23 returns to the operation at Step S314. When the operations from Step S314 to Step S324 are performed for each of a plurality of partitions, then the second assigning unit 23 ends the calculation of the target-role table and exits the present flowchart.

In this way, the second assigning unit 23 assigns the backup candidate nodes to the partitions in ascending order of the redundancy (i.e., in ascending order of the number of assigned backup nodes). Hence, the redundancy of the database can be guaranteed in an efficient manner. Moreover, with respect to a node 30 that has been assigned to serve as the backup candidate node for a number of times equal to or greater than a reference value, the second assigning unit 23 does not assign the node 30 anymore to serve as the backup candidate node. As a result, a plurality of nodes 30 can be assigned in a distributed manner to serve as the backup candidate nodes.

Figure 18:
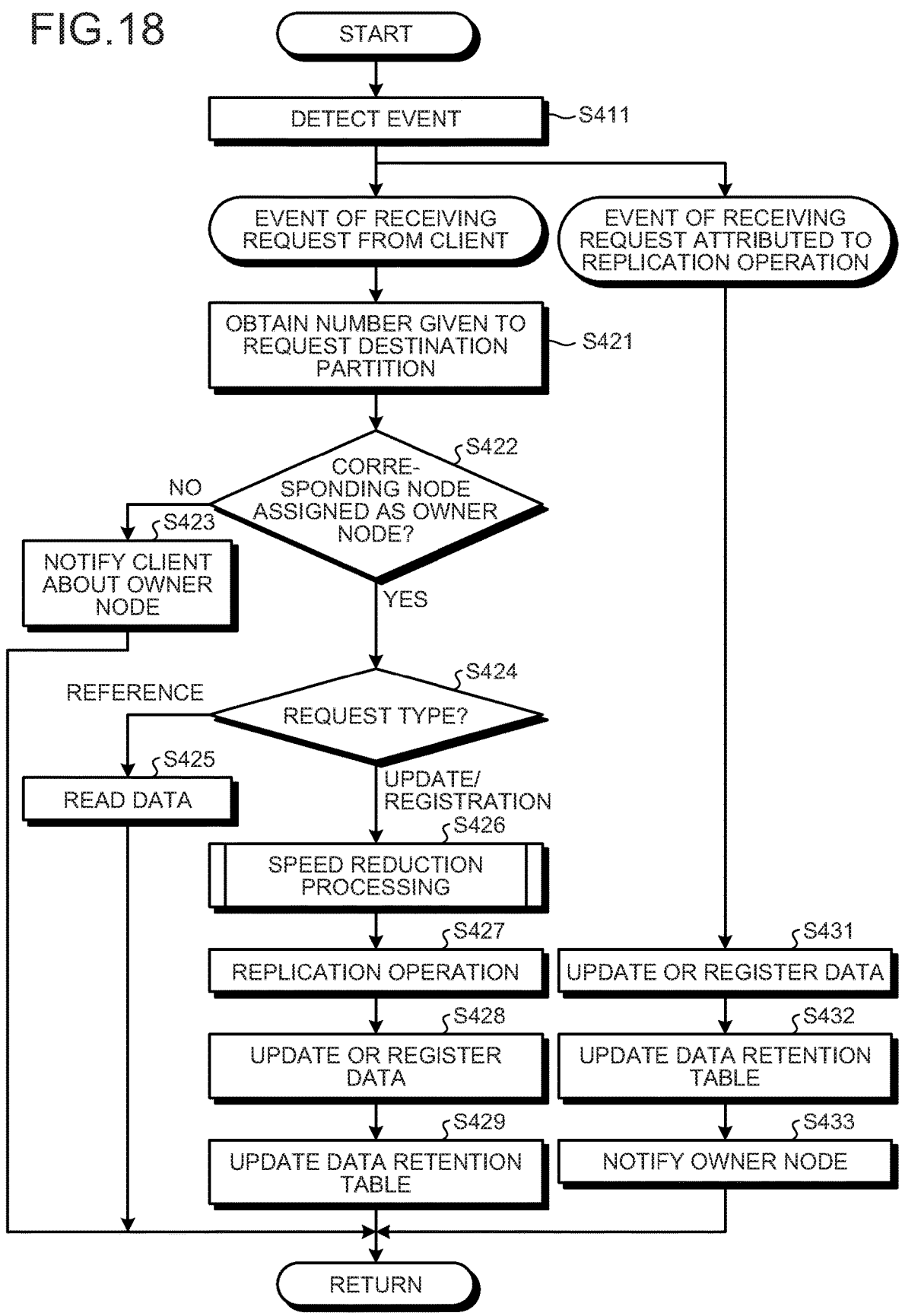
FIG. 18 is a diagram illustrating an operation flowchart of an access processing unit of the node.

FIG. 18 is a diagram illustrating an operation flowchart of the access processing unit 33 of the node 30. The access processing unit 33 performs operations from Step S411 to Step S433 explained below.

Firstly, at Step S411, the access processing unit 33 detects a request receive event from a client or detects a request receive event attributed to a replication operation. A request receive event from a client occurs in the case when an access request with respect to the data is received from a client via a network. A request receive event attributed to a replication operation occurs in the case when an update request or a registration request attributed to a replication operation is received via a network from another node 30 serving as the owner node.

When a request receive event from a client is detected, the access processing unit 33 proceeds to the operation at Step S421. When a request receive event attributed to a replication operation is detected, the access processing unit 33 proceeds to the operation at Step S431.

When a request receive event from a client is received; at Step S421, for example, the access processing unit 33 calculates and obtains the number given to a request destination partition specified in the access request from the client. Then, at Step S422, the access processing unit 33 refers to the current-role table and determines whether or not the corresponding node has been assigned to serve as the owner node for the request destination partition.

If the corresponding node has not been assigned to serve as the owner node for the request destination partition (No at Step S422); then, at Step S423, the access processing unit 33 notifies the client about the number given to the node 30 which has been assigned to serve as the owner node, and returns to the operation at Step S411.

On the other hand, if the corresponding node has been assigned to serve as the owner node for the request destination partition (Yes at Step S422); then, at Step S424, the access processing unit 33 determines whether the type of the access request points to a reference request, or an update request, or a registration request.

If the type of the access request points to a reference request (reference request at Step S424); then, at Step S425, the access processing unit 33 reads from the data storing unit 31 data for which the reference request is issued and sends the data to the client, and returns to the operation at Step S411.

If the type of the access request is an update request or a registration request (an update request or a registration request at Step S424), and when the long-term synchronization processing is being performed in parallel, the access processing unit 33 performs speed reduction processing, at Step S426, to reduce the speed of the processing according to an access request to a speed smaller than a predetermined speed. The speed reduction processing performed by the access processing unit 33 will further be described in detail with reference to FIG. 22. Then, at Step S427, the access processing unit 33 performs a replication operation with another node 30 that has been assigned to serve as the backup node for the request destination partition. That is, the access processing unit 33 sends an access request, which is identical to the update request or the registration request received from the client, to the node 30 which has been assigned to serve as the backup node.

Once the replication operation is completed; then, at Step S428, according to the update request or the registration request issued by the client, the access processing unit 33 either updates the data stored in the data storing unit 31 or registers new data in the data storing unit 31. Then, at Step S429, the access processing unit 33 updates the corresponding time stamp in the data retention table by incrementing the time stamp by one, and returns to the operation at Step S411.

Meanwhile, if a request receive event attributed to a replication operation is detected; then, at Step S431, according to an update request or a registration request issued by the node 30 which has been assigned to serve as the owner node, the access processing unit 33 either updates the data stored in the data storing unit 31 or registers new data in the data storing unit 31. Then, at Step S432, the access processing unit 33 updates the corresponding time stamp in the data retention table by incrementing the time stamp by one. Subsequently, at Step S433, the access processing unit 33 notifies the owner node about the completion of updating or registration, and returns to the operation at Step S411.

Meanwhile, at Step S425 and Step S429, the access processing unit 33 can also receive from a client a transaction that contains a sequence of access requests, and can perform transaction processing according to the access requests received from the client. Moreover, at Step S427, in the case of sending an update request or a registration request by means of a replication operation, the access processing unit 33 can send the transaction containing a sequence of access requests to the node 30 that is assigned to serve as the backup node. Furthermore, at Step S431, the access processing unit 33 can receive the transaction, which contains a sequence of access requests, from the node 30 that is assigned to serve as the owner node; and can perform transaction processing according to the access requests received from the node 30 that is assigned to serve as the owner node.

Figure 19:
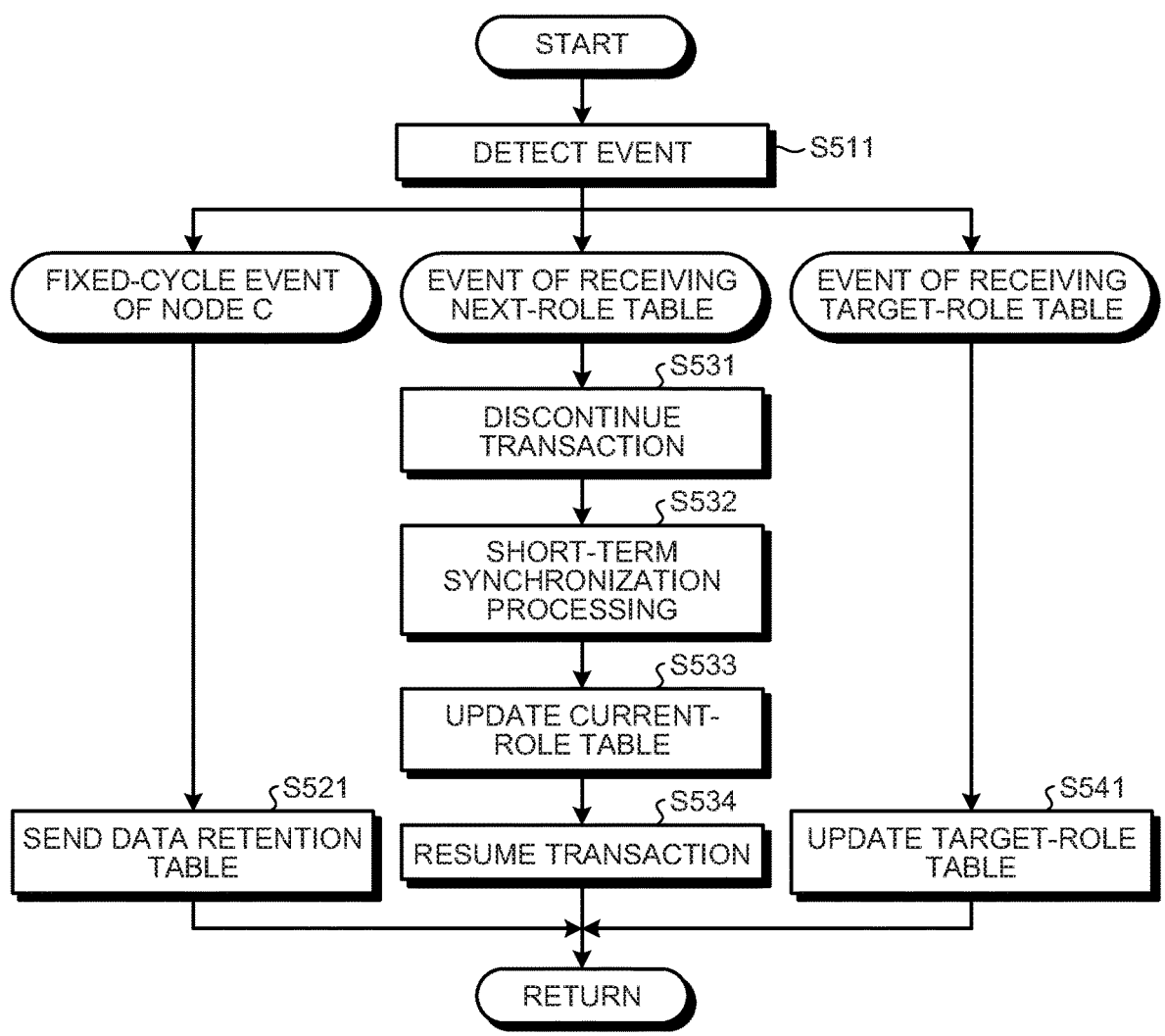
FIG. 19 is a diagram for explaining an operation flowchart of a node managing unit of the node.

FIG. 19 is a diagram for explaining an operation flowchart of the node managing unit 34 of the node 30. The node managing unit 34 performs operations from Step S511 to Step S541 explained below.

Firstly, at Step S511, the node managing unit 34 detects a third fixed-cycle event, a next-role-table receive event, or a target-role-table receive event. A third fixed-cycle receive event occurs on a periodic basis. A next-role-table receive event occurs when the node managing unit 34 receives the next-role table. A target-role-table receive event occurs when the node managing unit 34 receives the target-role table.

When a third fixed-cycle event is detected, the node managing unit 34 proceeds to the operation at Step S521. When a next-role-table receive event is detected, the node managing unit 34 proceeds to the operation at Step S531. When a target-role-table receive event is detected, the node managing unit 34 proceeds to the operation at Step S541.

When a third fixed-cycle event is detected; then, at Step S521, the node managing unit 34 sends the data retention table, which is stored in the table memory unit 32, to the cluster managing unit 24 of the management device 20. Then, the node managing unit 34 returns to the operation at Step S511.

When a next-role-table receive event is detected; then, at Step S531, if the access processing unit 33 is executing a transaction, the node managing unit 34 discontinues the transaction. Then, at Step S532, the node managing unit 34 performs short-term synchronization processing according to the next-role table that is received.

More particularly, with respect to each of a plurality of partitions, if the data pieces stored in the node 30 assigned to serve as the owner node differ from the data pieces stored in the node 30 assigned to serve as the backup node, then the node managing unit 34 causes the access processing unit 33 to perform an operation identical to the replication operation. With that, with respect to each of a plurality of partitions, the node managing unit 34 can achieve synchronization between the node 30 assigned to serve as the owner node and the node 30 assigned to serve as the backup node. Then, with respect to each of a plurality of nodes, the node managing unit 34 cases the access processing unit 33 to perform operations according to the new roles (as the owner node and the backup node) assigned in the next-role table.

Once the short-term synchronization processing is completed; then, at Step S533, the node managing unit 34 rewrites the current-role table with the contents of the next-role table. After that, the access processing unit 33 can receive an access request from a client.

Subsequently, at Step S534, the node managing unit 34 resumes the transaction that was discontinued. Then, the node managing unit 34 returns to the operation at Step S511.

If a target-role-table receive event is detected; then, at Step S541, the node managing unit 34 updates the target-role table stored in the table memory unit 32. Then, the node managing unit 34 returns to the operation at Step S511.

Figure 20:
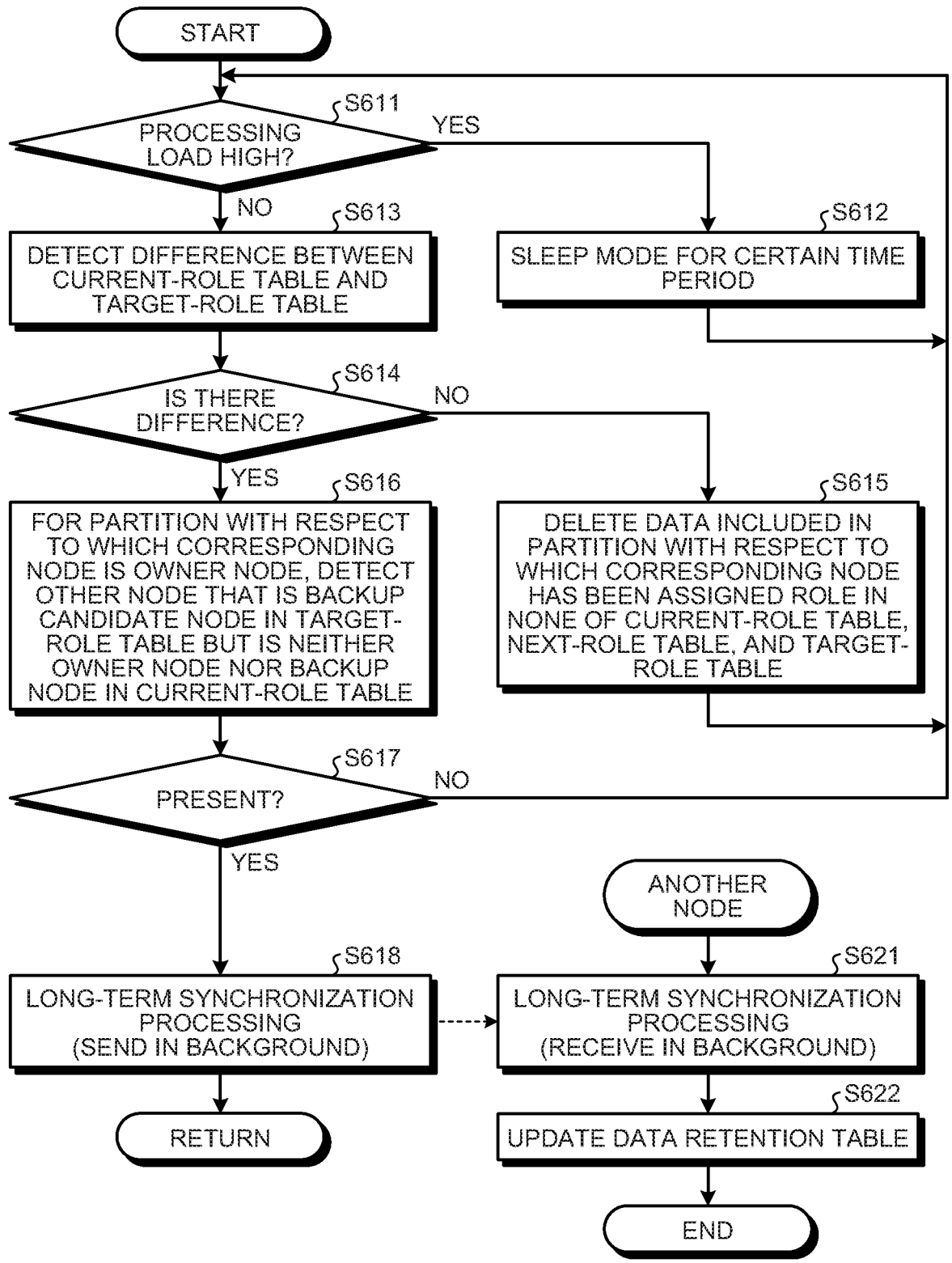
FIG. 20 is a diagram illustrating an operation flowchart of a transferring unit of the node.

FIG. 20 is a diagram illustrating an operation flowchart of the transferring unit 35 of the node 30. The transferring unit 35 performs operations from S611 to Step S618 as well as operations at Step S621 and Step S622 explained below.

Firstly, at Step S611, the transferring unit 35 determines whether or not the processing load of the CPU 12 is greater than a predetermined reference value. If the processing load of the CPU 12 is greater than the reference value (Yes at Step S611); then, at Step S612, the transferring unit 35 switches to a sleep mode for a certain amount of time and then returns to the operation at Step S611.

However, if the processing load of the CPU 12 is equal to or smaller than the reference value (No at Step S611); then, at Step S613, the transferring unit 35 detects the difference between the current-role table and the target-role table. Subsequently, at Step S614, the transferring unit 35 determines whether or not there is difference between the current-role table and the target-role table.

If there is no difference between the current-role table and the target-role table (No at Step S614); then, at Step S615, the transferring unit 35 deletes the data pieces included in a partition with respect to which the corresponding node has been assigned a role in none of the current-role table, the next-role table, and the target-role table. After performing the operation at Step S615, the transferring unit 35 returns to the operation at Step S611.

On the other hand, if there is difference between the current-role table and the target-role table (Yes at Step S614); then, at Step S616, for the partition with respect to which the corresponding node is assigned to serve as the owner node in the current-role table, the transferring unit 35 detects another node 30 that is assigned to serve as the backup candidate node in the target-role table as well as that is neither assigned to serve as the owner node nor assigned to serve as the backup node in the current-role table.

Subsequently, at Step S617, the transferring unit 35 determines whether or not another node 30 is present that is assigned to serve as the backup candidate node in the target-role table as well as that is neither assigned to serve as the owner node nor assigned to serve as the backup node in the current-role table. If such a node 30 is not present (No at Step S617), then the transferring unit 35 returns to the operation at Step S611.

On the other hand, if such a node is present (Yes at Step S617); then, at Step S618, the transferring unit 35 starts long-term synchronization processing without discontinuing the operations with respect to the access request from the client. More particularly, regarding the partition for which the corresponding node is assigned to serve as the owner node in the current-role table, the transferring unit 35 sends the data pieces of that partition to the other node 30 that is assigned to serve as the backup candidate node in the target-role table as well as that is neither assigned to serve as the owner node nor assigned to serve as the backup node in the current-role table. In this case, the transferring unit 35 sends the data pieces in the background so as not to interrupt the transaction execution by the access processing unit 33. With that, the transferring unit 35 becomes able to perform the long-term synchronization processing without causing a decrease in the response speed with respect to the access request from the client. The long-term synchronization processing performed by the transferring unit 35 will further be described with reference to FIG. 21.

Once the operation at Step S618 is completed, the transferring unit 35 returns to the operation at Step S611.

Meanwhile, in the other node 30 that is assigned to serve as the backup candidate node in the target-role table as well as that is neither assigned to serve as the owner node nor assigned to serve as the backup node in the current-role table; the corresponding transferring unit 35 performs operations at Step S621 and Step S622 explained below.

At Step S621, the transferring unit 35 starts long-term synchronization processing without discontinuing the operations with respect to the access request from the client. More particularly, regarding the partition with respect to which the corresponding node is assigned to serve as the backup candidate node in the target-role table as well as is neither assigned to serve as the owner node nor assigned to serve as the backup node in the current-role table, the transferring unit 35 receives the data pieces of that partition from the node 30 that is assigned to serve as the owner node with respect to that partition. In this case, the transferring unit 35 receives the data pieces in the background so as not to interrupt the transaction execution by the access processing unit 33.

Subsequently, at Step S622, the transferring unit 35 updates the data retention table. Once the long-term synchronization processing is completed, a replica of the data pieces, which are stored in the node 30 assigned to serve as the owner node, gets stored. Thus, by updating the data retention table, the transferring unit 35 can match the time stamp for the concerned partition with the time stamp in the data retention table of the owner node. Once the operation at Step S622 is completed, the transferring unit 35 exits the present flowchart.

In this way, a replica of the data pieces of the node 30 assigned to serve as the owner node is generated by the transferring unit 35 in the node 30 that is assigned to serve as the backup candidate node. As a result, the transferring unit 35 can newly generate a node 30 that can be assigned to serve either as the owner node or as the backup node.

Figure 21:
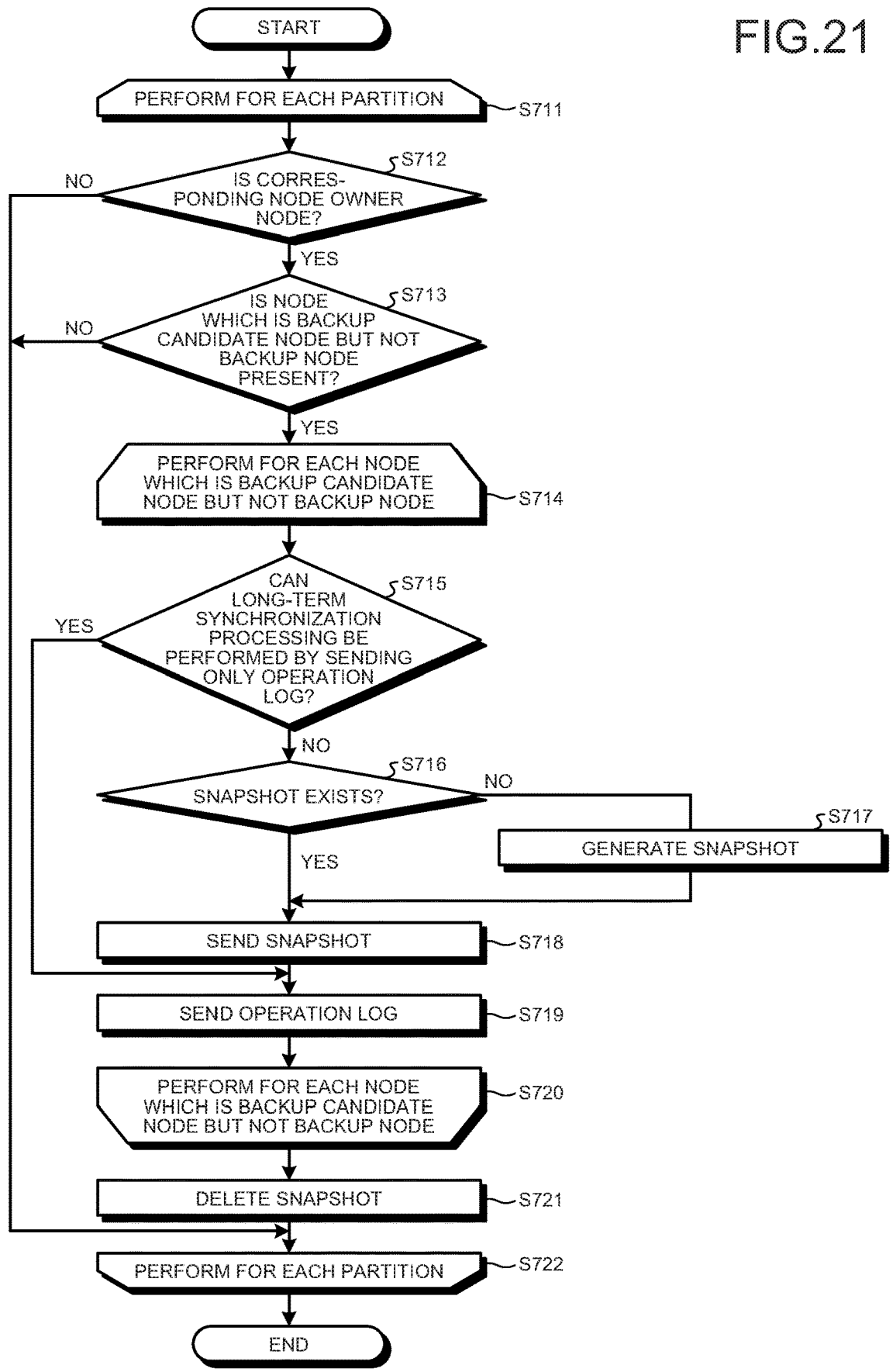
FIG. 21 is a diagram for explaining an operation flowchart of long-term synchronization processing of a transferring unit of the node.

FIG. 21 is a diagram for explaining an operation flowchart of the long-term synchronization processing of the transferring unit 35 of the node 30. The transferring unit 35 performs operations from Step S711 to Step S722 explained below in the long-term synchronization processing.

Firstly, from Step S711 to Step S722, the transferring unit 35 performs a loop operation on a partition-by-partition basis. For example, if the database is partitioned into a first partition to a third partition, the transferring unit 35 performs the operations from Step S712 to Step S721 with respect to each of the first partition, the second partition, and the third partition.

In the loop operation performed on a partition-by-partition basis, firstly, at Step S712, the transferring unit 35 refers to the current-role table and determines whether or not the corresponding node has been assigned to serve as the owner node for the target partition. If the corresponding node has not been assigned to serve as the owner node for the target partition (No at Step S712), the transferring unit 35 proceeds to the operation at Step S722 to repeat the operations from Step S711 for the next partition as a target.

If the corresponding node has been assigned to serve as the owner node for the target partition (Yes at Step S712), the transferring unit 35 proceeds to the operation at Step S713. At Step S713, the transferring unit 35 determines whether or not a node 30 is present that is assigned to serve as the backup candidate node in the target-role table as well as that is not assigned to serve as the backup node in the current-role table in the target partition. If a node 30 that is assigned to serve as the backup candidate node in the target-role table as well as that is not assigned to serve as the backup node in the current-role table is not present in the target partition (No at Step S713), the transferring unit 35 proceeds to the operation at Step S722 to repeat the operation from Step S711 for the next partition as a target.

If a node 30 that is assigned to serve as the backup candidate node in the target-role table as well as that is not assigned to serve as the backup node in the current-role table is present in the target partition (Yes at Step S713), the transferring unit 35 proceeds to the operation at Step S714.

From Step S714 to Step S720, the transferring unit 35 performs a loop operation for each node 30 that serves as the backup candidate node but not as the backup node for the target partition. In the loop operation performed for each node 30, firstly, at Step S715, the transferring unit 35 determines whether or not the long-term synchronization processing can be performed by sending only the operation log. For example, for the target partition, if the difference between the time stamp retained in the node 30 serving as the owner node and the time stamp retained in the node 30 to be processed is within a predetermined range (for example, within 100 time stamps), the transferring unit 35 determines that the long-term synchronization processing can be performed by sending only the operation log.

If the long-term synchronization processing can be performed by sending only the operation log (Yes at Step S715), the transferring unit 35 proceeds to the operation at Step S719. If the long-term synchronization processing cannot be performed by sending only the operation log (No at Step S715), the transferring unit 35 proceeds to the operation at Step S716.

Subsequently, at Step S716, the transferring unit 35 determines whether or not a snapshot of the target partition exists. That is, the transferring unit 35 determines whether or not a snapshot of the target partition has already been generated.

If a snapshot of the target partition does not exist (No at Step S716), the transferring unit 35 generates, at Step S717, a snapshot of the data pieces in the target partition at the present clock time (first clock time). When the snapshot is generated, the transferring unit 35 proceeds to the operation at Step S718. If a snapshot of the target partition exists (Yes at Step S716), the transferring unit 35 proceeds to the operation at Step S718.

At Step S718, the transferring unit 35 sends the snapshot to the target node 30 (the node 30 that serves as the backup candidate node in the target-role table but not as the backup node in the current-role table). When sending of the snapshot is completed, then at Step S719, the transferring unit 35 sends operation logs that are obtained at and after the clock time, at which the snapshot is obtained (the first clock time), according to access requests for updating and registering the data pieces in the target partition to the target node 30.

Subsequently, when the operations from Step S715 to Step S719 are completed for every node 30 that serves as the backup candidate node but not as the backup node in the target partition, the transferring unit 35 proceeds to the operation at Step S721. At Step S721, the transferring unit 35 deletes the snapshot of the target partition.

Subsequently, when the operations from Step S712 to Step S721 are completed for every partition, the transferring unit 35 exits the present flowchart.

In this way, the transferring unit 35 performs the long-term synchronization processing by sending the snapshot and the operation log. The transferring unit 35 of another node 30 that has received the snapshot and the operation log restores an image of the data pieces of the target partition at the present point of time from the snapshot and the operation log that have been received. This enables performing the short-term synchronization processing.

In this way, the transferring unit 35 can perform the long-term synchronization processing in an efficient manner even when an access request for updating or registering is made after generating a snapshot, because there is no need to send the snapshot again.

Figure 22:
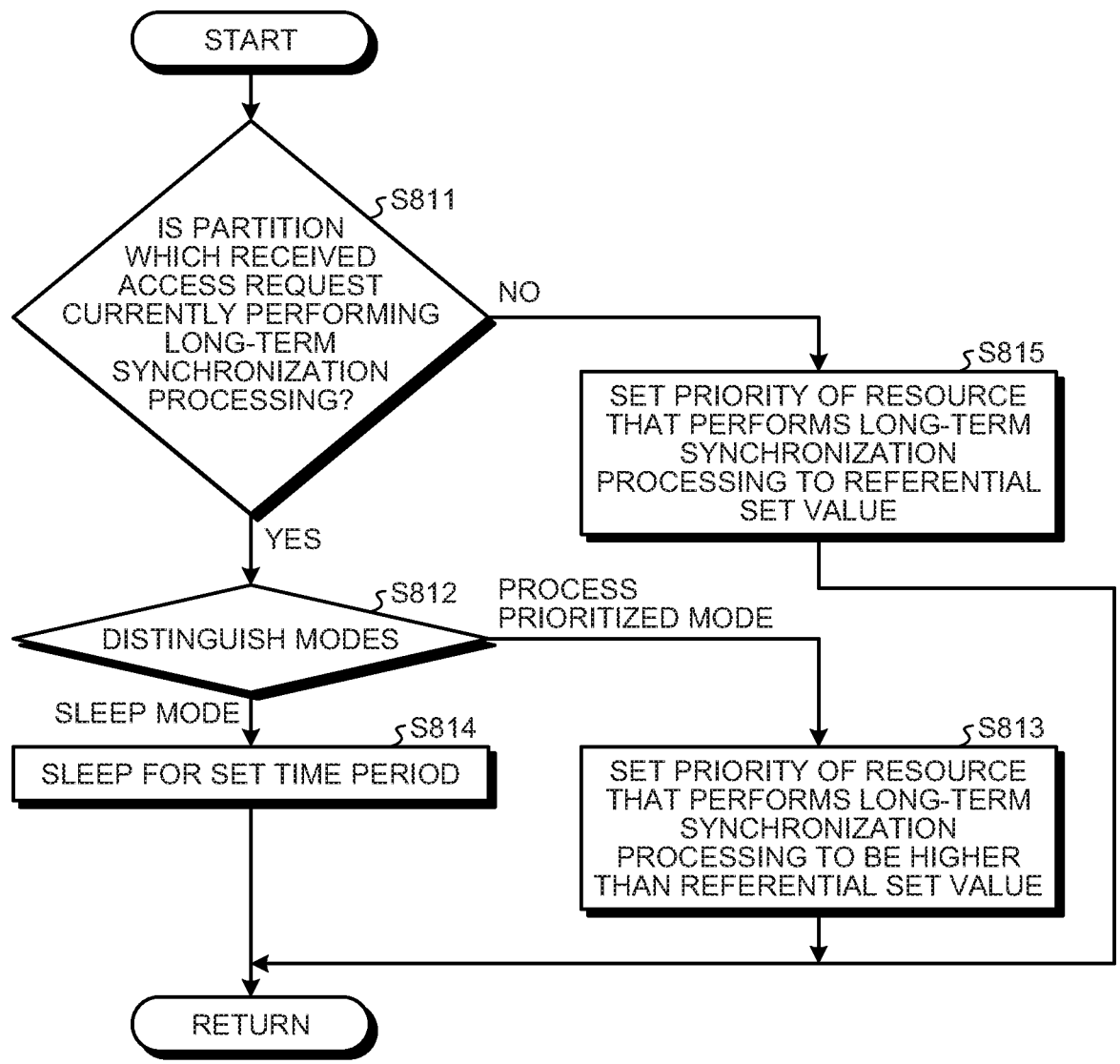
FIG. 22 is a diagram for explaining an operation flowchart of speed reduction processing of an access processing unit of the node.

FIG. 22 is a diagram for explaining an operation flowchart of the speed reduction processing performed by an access processing unit 33 of the node 30. If the type of the access request from a client is the update request or a registration request, the access processing unit 33 performs the speed reduction processing from Step S811 to Step S815 explained below.

Firstly, in Step S811, the access processing unit 33 determines whether or not the partition that has received the access request is performing the long-term synchronization processing. If the long-term synchronization processing is being performed (Yes at Step S811), the access processing unit 33 distinguishes the mode of the speed reduction processing at Step S812. Either a process prioritized mode or a sleep mode is previously registered in the node 30 as the mode of the speed reduction processing.

When performing the process prioritized mode (the process prioritized mode at Step S812), the access processing unit 33 sets, at Step S813, the priority of the resource that performs the long-term synchronization processing (for example, a CPU 12, a thread, or a process) higher than a referential set value. By the access processing unit 33 setting the priority of the resource that performs the long-term synchronization processing higher than the referential set value, the CPU 12 sets the throughput of an operation other than the long-term synchronization processing (for example, an operation according to the access request) to be relatively low and the throughput of the long-term synchronization processing to be relatively high. In this way, the access processing unit 33 can surely perform the long-term synchronization processing even under increased access requests.

When performing a sleep mode (the sleep mode at Step S812), the access processing unit 33 sets, at Step S814, the registering and updating operation according to an access request from a client to sleep (for example, temporarily stop) for a predetermined time period. In this way, the transferring unit 35 can surely perform the long-term synchronization processing even under increased access requests, because the long-term synchronization processing does not stop or slows down.

Meanwhile, if the long-term synchronization processing is not being performed (No at Step S811) the access processing unit 33 sets, at Step S815, the priority of the resource that performs the long-term synchronization processing to the referential set value. In this way, the access processing unit 33 can perform the operation according to an access request at a normal speed when the long-term synchronization processing is not being performed.

Then, after the access processing unit 33 completes the operation at Step S813, Step S814, or Step S815, the access processing unit 33 exits the present flowchart. As described above, when the long-term synchronization processing is being performed, the resource is assigned to the transferring unit 35 with priority over other processing units, so that the access processing unit 33 can surely perform the long-term synchronization processing.

Figure 23:
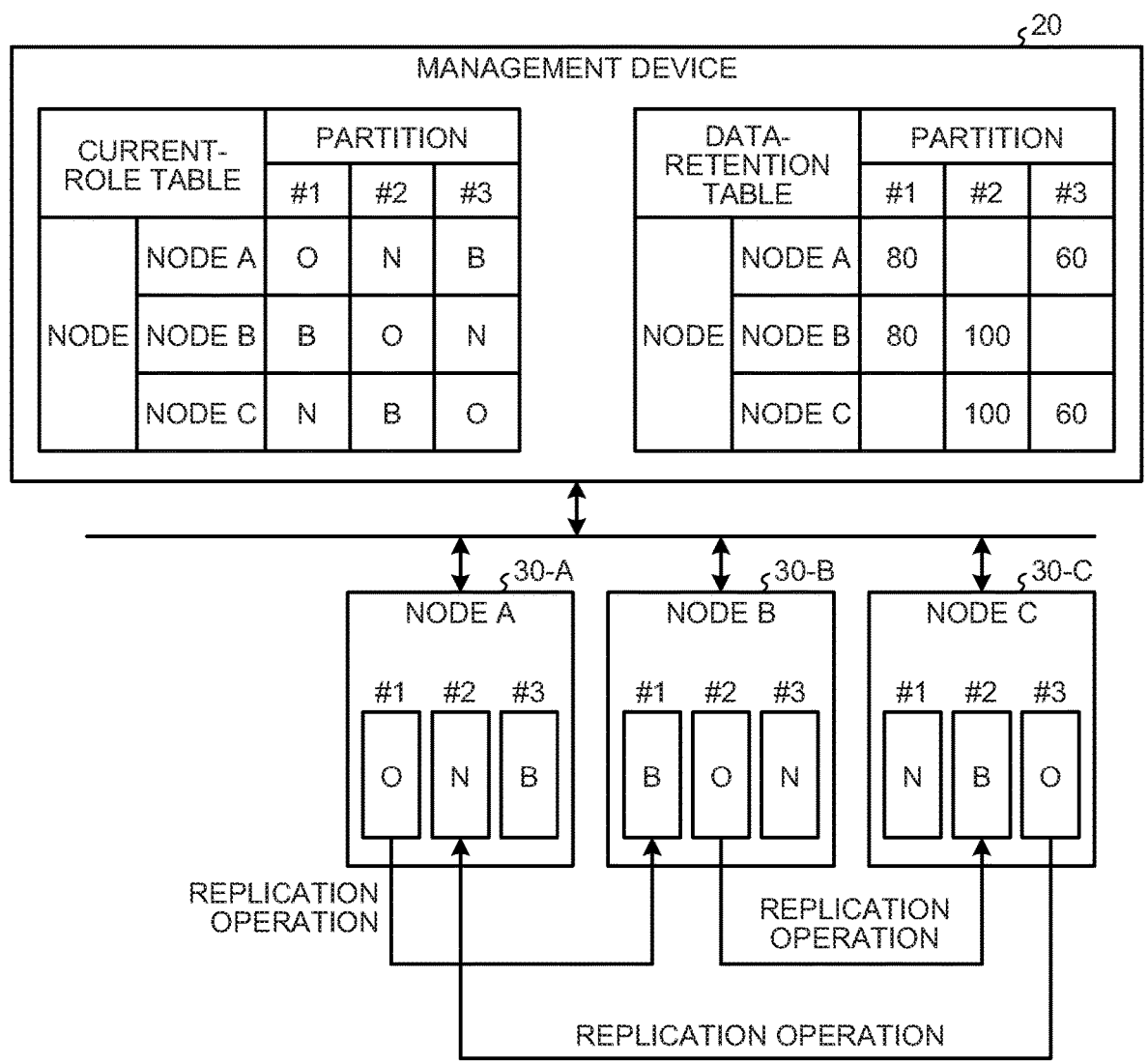
FIG. 23 is a diagram illustrating the states of a node 30-A to a node 30-C in a case in which each of three partitions #1 to #3 is assigned with the nodes serving as the owner node and the backup node.

Explained below with reference to FIG. 23 to FIG. 29 is an example of operations performed in the database system 10. FIG. 23 is a diagram illustrating the states of a node 30-A to a node 30-C in a case in which each of the three partitions #1 to #3 is assigned with the nodes 30 serving as the owner node and the backup node.

In the present example, as illustrated in FIG. 23, with respect to the partition #1, the node 30-A is assigned to serve as the owner node and the node 30-B is assigned to serve as the backup node. Moreover, with respect to the partition #2, the node 30-B is assigned to serve as the owner node and the node 30-C is assigned to serve as the backup node. Furthermore, with respect to the partition #3, the node 30-C is assigned to serve as the owner node and the node 30-A is assigned to serve as the backup node.

The nodes 30-A and 30-B perform replication operations with respect to the partition #1 by means of transactions. As a result, as illustrated in data retention table in FIG. 23, the time stamps of the nodes 30-A and 30-B have the same value for the partition #1.

The nodes 30-B and 30-C perform replication operations with respect to the partition #2 by means of transactions. As a result, as illustrated in data retention table in FIG. 23, the time stamps of the nodes 30-B and 30-C have the same value for the partition #2.

The nodes 30-C and 30-A perform replication operations with respect to the partition #3 by means of transactions. As a result, as illustrated in data retention table in FIG. 23, the time stamps of the nodes 30-C and 30-A have the same value for the partition #3.

Figure 24:
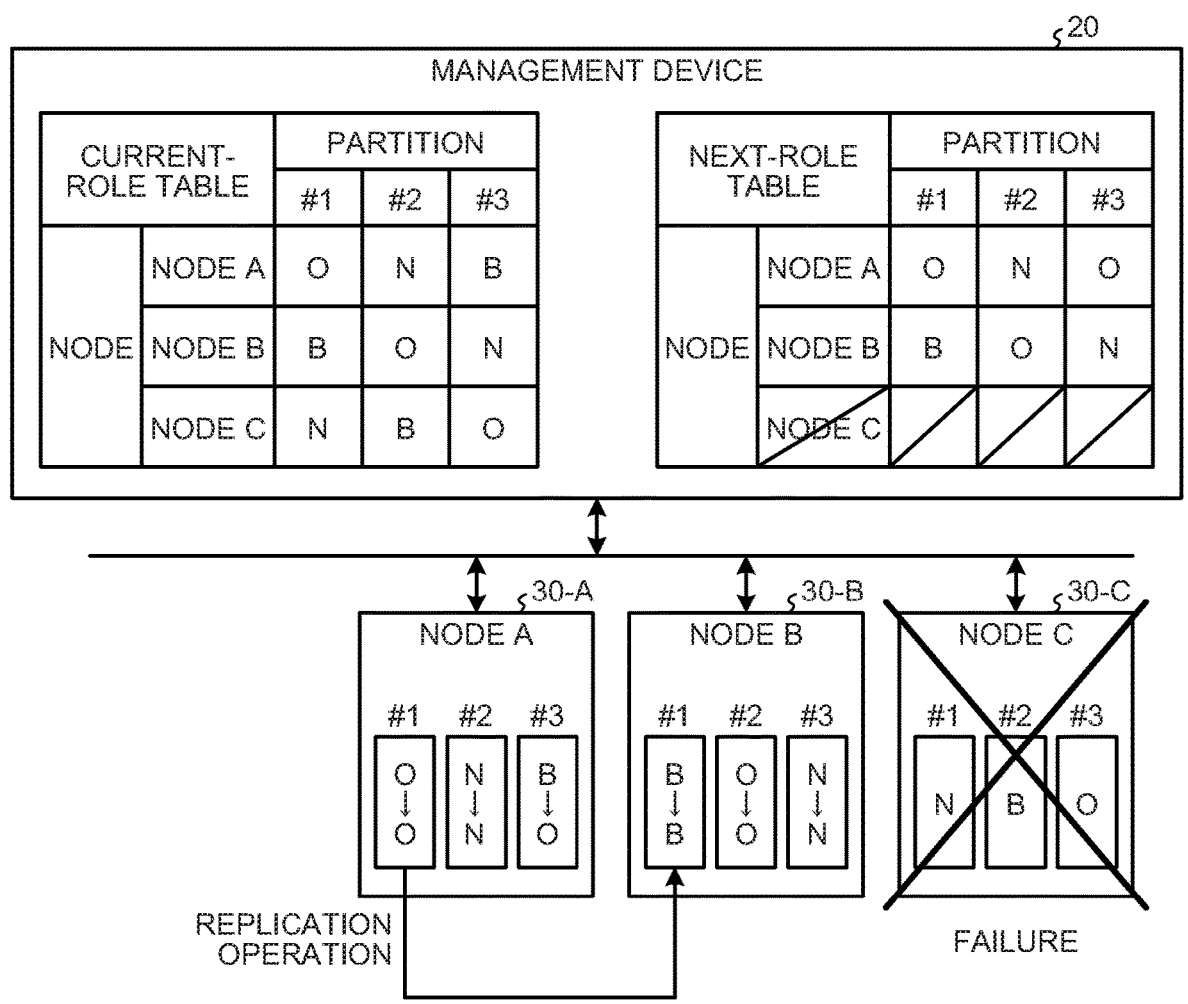
FIG. 24 is a diagram illustrating the states of the node 30-A to the node 30-C after short-term synchronization processing is performed in response to a failure occurring in the node 30-C in the state illustrated in FIG. 23.

FIG. 24 is a diagram illustrating the states of the node 30-A to the node 30-C after short-term synchronization processing is performed in response to a failure occurring in the node 30-C in the state illustrated in FIG. 23. Herein, it is assumed that the cluster managing unit 24 of the management device 20 cannot detect the data retention table from the node 30-C in the state illustrated in FIG. 23, and detects that a failure has occurred in the node 30-C.

When a failure occurs in any one node 30 of a plurality of nodes 30, the cluster managing unit 24 of the management device 20 separates off the node 30 in which a failure has occurred and then causes the first assigning unit 22 to calculate the next-role table.

In response to being called by the cluster managing unit 24; the first assigning unit 22 reassigns, with the exclusion of the node 30 in which a failure has occurred, the nodes 30 that would serve as the owner nodes and the nodes 30 that would serve as the backup nodes, to thereby generate the next-role table. In this case, with the aim of at least making the database work, the first assigning unit 22 assigns the nodes 30 in such a way that each of a plurality of partitions has at least the owner node assigned thereto. For example, if a failure occurs in the node 30 assigned to serve as the owner node; then the first assigning unit 22 assigns the node 30 which was assigned to serve as the backup node to now serve as the owner node. Moreover, with the aim of further enhancing the redundancy of the database, the first assigning unit 22 assigns the nodes 30 in such a way that each of a plurality of partitions has the backup node assigned thereto to the extent possible.

In the present example, as a result of the reassignment, as illustrated in the next-role table in FIG. 24; with respect to the partition #1, the node 30-A is assigned to serve as the owner node and the node 30-B is assigned to serve as the backup node. Moreover, with respect to the partition #2, the node 30-B is assigned to serve as the owner node. Furthermore, with respect to the partition #3, the node 30-A is assigned to serve as the owner node.

Then, the cluster managing unit 24 distributes the next-role table to the node 30-A and the node 30-B. Upon receiving the next-role table, the node managing unit 34 of each of the node 30-A and the node 30-B performs short-term synchronization processing and rewrites the contents of the current-role table with the contents of the next-role table. With that, each of the node 30-A and the node 30-B can perform operations according to its newly-assigned role.

Figure 25:
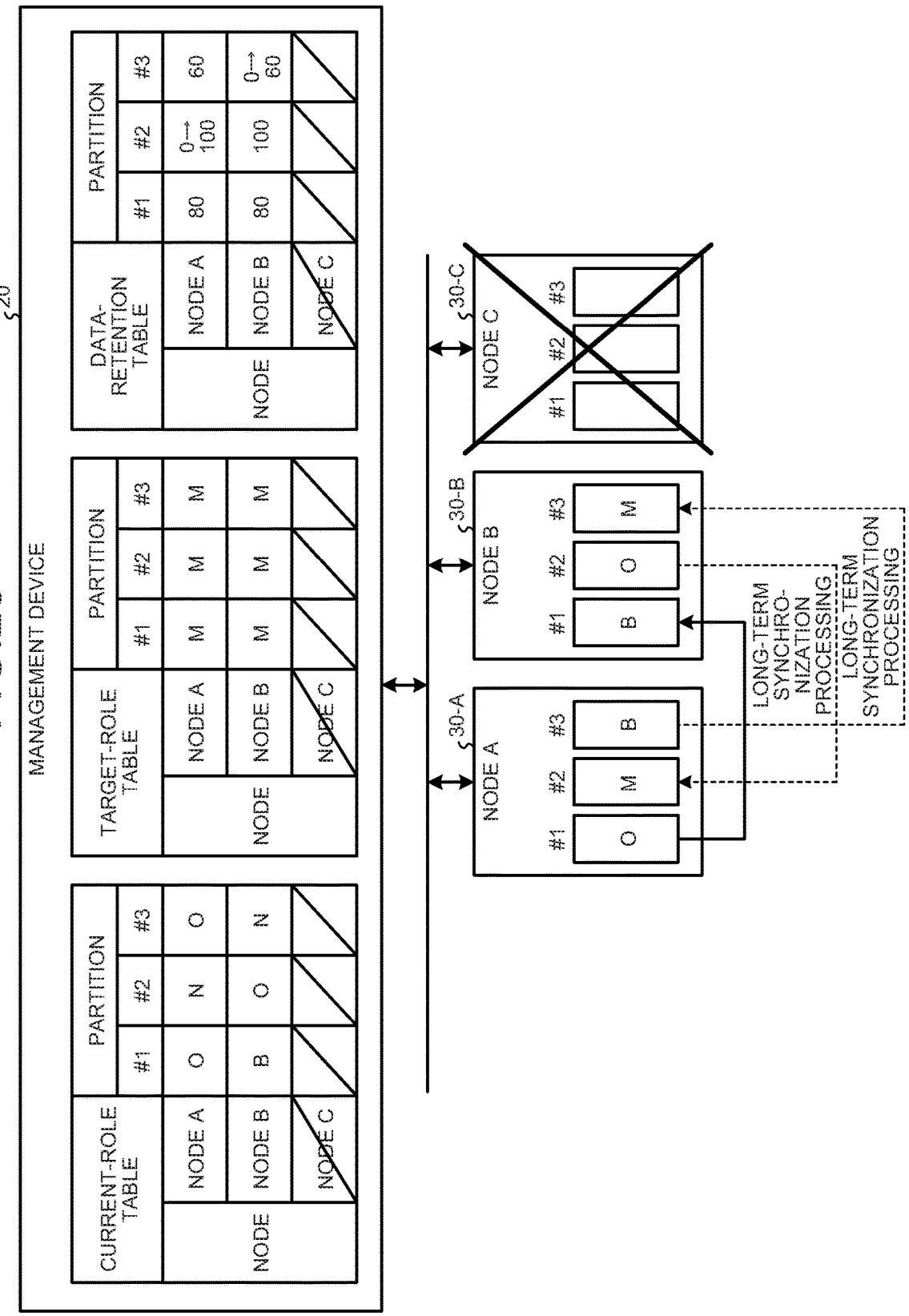
FIG. 25 is a diagram illustrating an example of long-term synchronization processing performed in the state illustrated in FIG. 24.

FIG. 25 is a diagram illustrating an example of long-term synchronization processing performed in the state illustrated in FIG. 24. The cluster managing unit 24 of the management device 20 separates off the node 30-C in which a failure has occurred, and then causes the second assigning unit 23 to calculate the target-role table.

In response to being called by the cluster managing unit 24; the second assigning unit 23 reassigns, with the exclusion of the node 30 in which a failure has occurred, the nodes 30 that would serve as the backup candidate nodes, to thereby generate the target-role table. In this case, with the aim of further enhancing the redundancy of the database, the second assigning unit 23 assigns the nodes 30 that would serve as the backup candidate nodes in such a way that each of a plurality of partitions at least has the owner node and the backup node assigned thereto.

In the state illustrated in FIG. 24, with respect to the partition 42 as well as the partition #3, no node 30 is assigned to serve as the backup node. Thus, the second assigning unit 23 assigns the node 30-A to serve as the backup candidate node for the partition #2, and assigns the node 30-B to serve as the backup candidate node for the partition #3.

Meanwhile, in the present example, the second assigning unit 23 assigns, as the backup candidate nodes, such nodes 30 too that are already assigned to serve as the owner nodes and the backup nodes in the current-role table. For that reason, as illustrated in the target-role table in FIG. 25, with respect to each of the partitions #1 to #3, the node 30-A as well as the node 30-B is assigned to serve as the backup candidate node.

Then, the cluster managing unit 24 distributes the target-role table to the node 30-A and the node 30-B. Subsequently, the transferring unit 35 of the node 30-A as well as the node 30-B performs long-term synchronization processing with respect to the portion of difference between the current-role table and the target-role table. That is, the transferring unit 35 of the node 30-B sends the data pieces of the partition #2 to the node 30-A in the background. Moreover, the transferring unit 35 of the node 30-A sends the data pieces of the partition #3 to the node 30-B in the background.

At that time, each transferring unit 35 performs the long-term synchronization processing without discontinuing the operations with respect to the access request from the client.

Once the long-term synchronization processing is completed, the node 30-A can store therein a replica of the data pieces of the partition #2. Moreover, as illustrated in the data retention table in FIG. 25, the time stamps of the nodes 30-A and 30-B have the same value for the partition #2.

Similarly, the node 30-B can store therein a replica of the data pieces of the partition #3. Moreover, as illustrated in the data retention table in FIG. 25, the time stamps of the nodes 30-A and 30-B have the same value for the partition #3.

Figure 26:
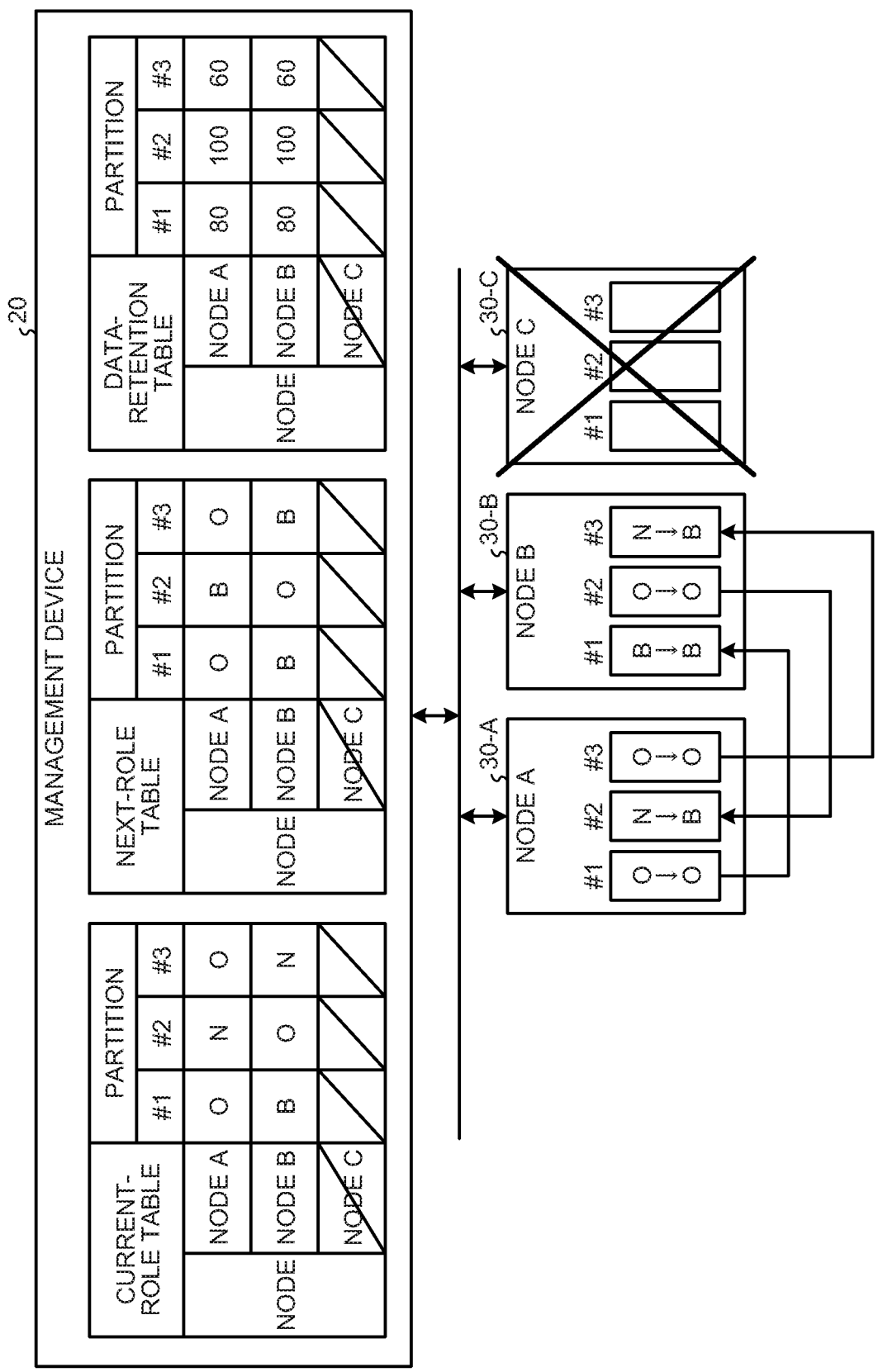
FIG. 26 is a diagram illustrating the states of the node 30-A to the node 30-C after short-term synchronization processing is performed upon completion of the long-term synchronization processing explained with reference to FIG. 25.

FIG. 26 is a diagram illustrating the states of the node 30-A to the node 30-C after short-term synchronization processing is performed upon completion of the long-term synchronization processing explained with reference to FIG. 25. The cluster managing unit 24 of the management device 20 periodically calls the first assigning unit 22 and causes it to calculate the next-role table.

Upon being called by the cluster managing unit 24 after the completion of the long-term synchronization processing, the first assigning unit 22 reassigns, with respect to each of a plurality of partitions, the nodes 30 to serve as the owner node and the backup node in such a way that the redundancy increases using the replicas generated in the long-term synchronization processing.

In the present example, as illustrated in the next-role table in FIG. 26, with respect to the partition #1, the node 30-A is assigned to serve as the owner node and the node 30-B is assigned to serve as the backup node. Moreover, with respect to the partition #2, the node 30-B is assigned to serve as the owner node and the node 30-A is assigned to serve as the backup node. Furthermore, with respect to the partition #3, the node 30-A is assigned to serve as the owner node and the node 30-B is assigned to serve as the backup node.

Then, the cluster managing unit 24 distributes the next-role table to the node 30-A and the node 30-B. Upon receiving the next-role table, the node managing unit 34 of each of the node 30-A and the node 30-B performs short-term synchronization processing and rewrites the contents of the current-role table with the contents of the next-role table. With that, each of the node 30-A and the node 30-B becomes able to perform operations according to its newly-assigned role.

Figure 27:
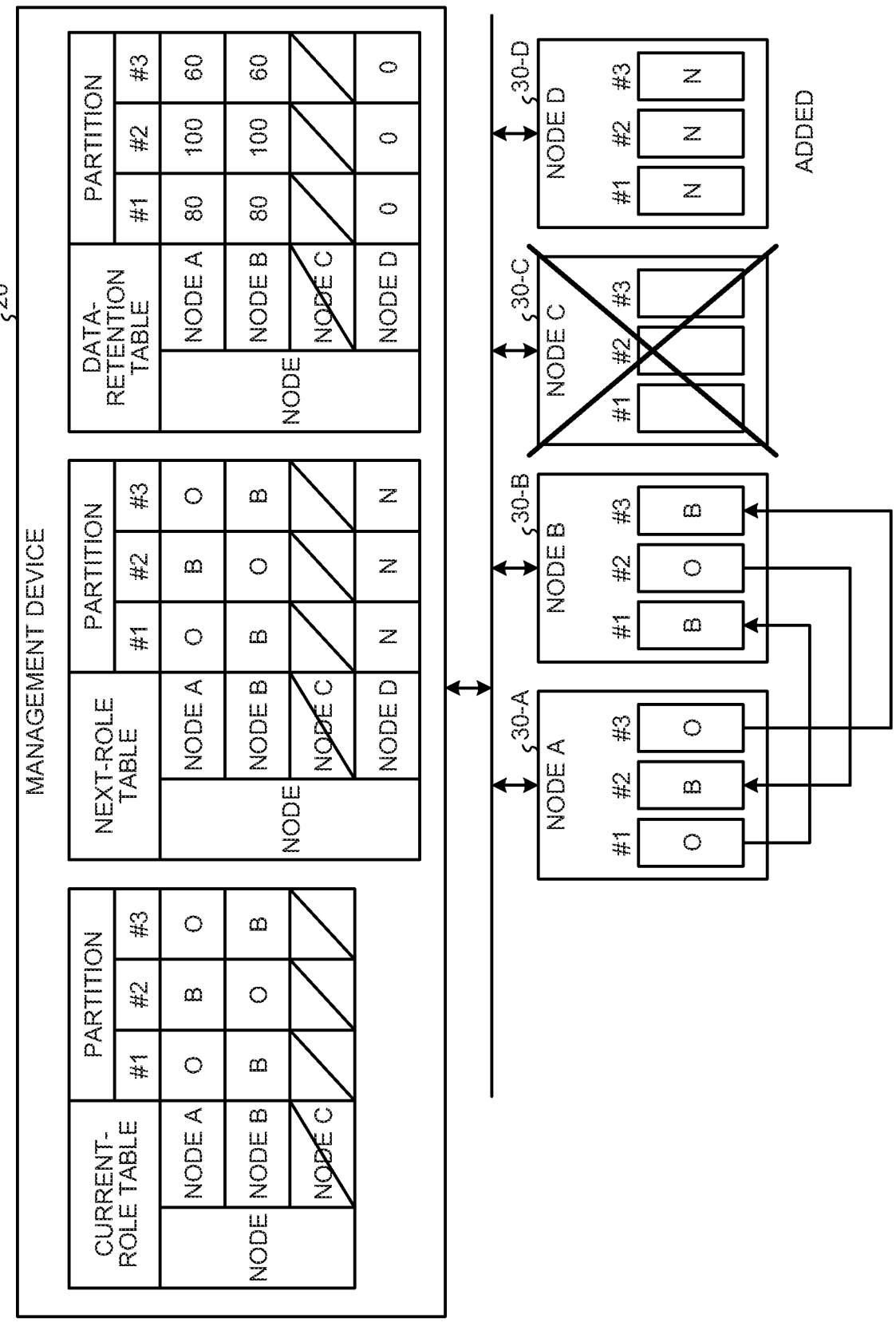
FIG. 27 is a diagram illustrating the states of the node 30-A to a node 30-D in a case in which the node 30-D is added to the state illustrated in FIG. 26.

FIG. 27 is a diagram illustrating the states of the node 30-A to a node 30-D in a case in which the node 30-D is added to the state illustrated in FIG. 26. Herein, for example, it is assumed that the cluster managing unit 24 of the management device 20 detects that the node 30-D is newly added in the state illustrated in FIG. 26.

As illustrated in the data retention table in FIG. 27, the cluster managing unit 24 generates the data retention table in which the node 30-D is added. In response to the addition of the node 30-D in the data retention table, the first assigning unit 22 generates the next-role table in which the node 30-D is added.

Of course, the node 30-D does not have any data pieces stored therein. Thus, immediately after the addition of the node 30-D, the first assigning unit 22 does not change the assignment of the owner nodes and the backup nodes.

Figure 28:
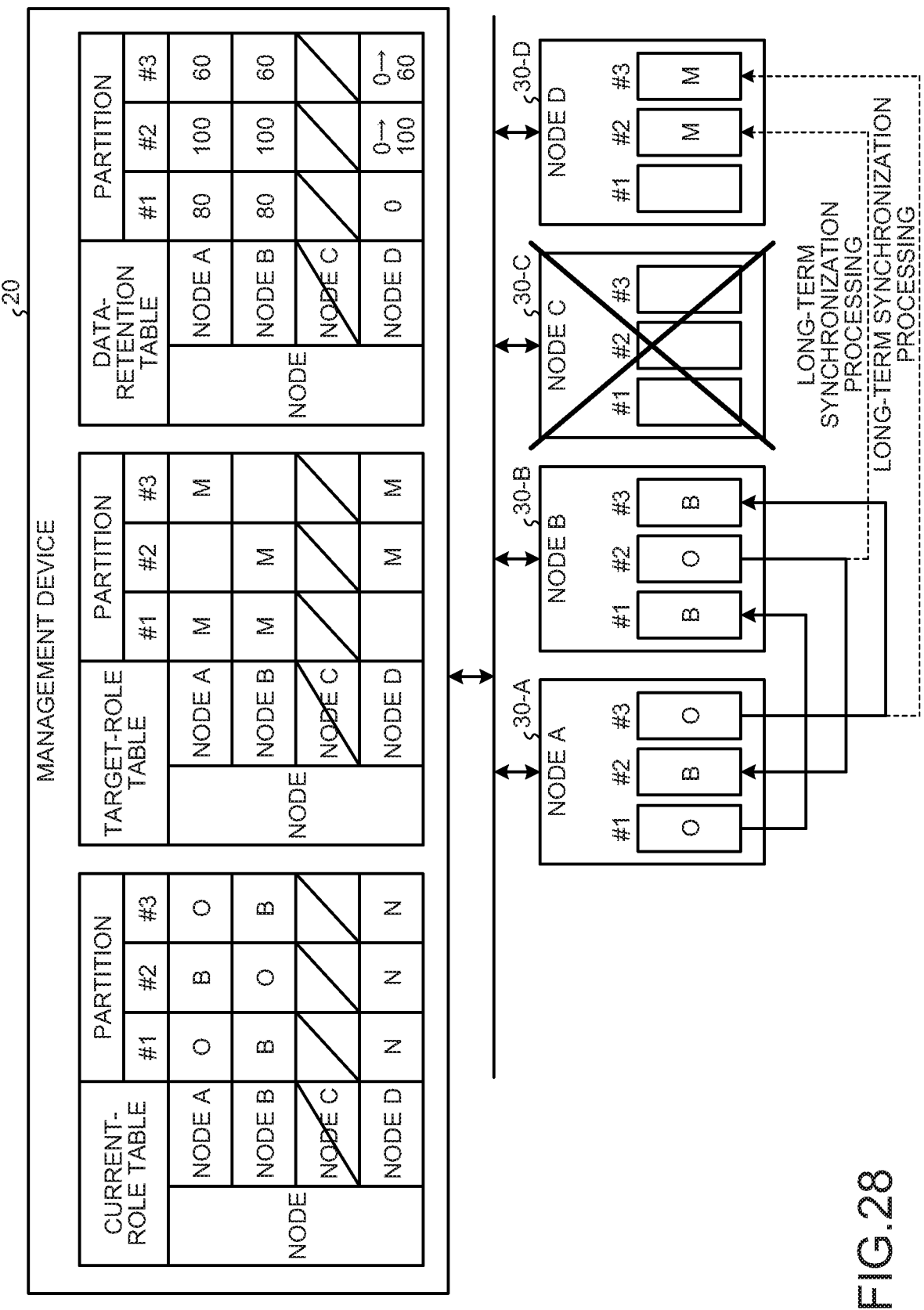
FIG. 28 is a diagram illustrating an example of long-term synchronization processing performed in the state illustrated in FIG. 27.

FIG. 28 is a diagram illustrating an example of long-term synchronization processing performed in the state illustrated in FIG. 27. When a new node 30 is added, the second assigning unit 23 reassigns, with respect to each of a plurality of partitions, the nodes 30 including the new node 30 to serve as the backup candidate nodes. In this case, with respect to each of a plurality of partitions, the second assigning unit 23 assigns the nodes 30 to serve as the backup candidate nodes in such a way that the difference in the number of assigned owner nodes and the number of assigned backup nodes is within a range of values determined in advance among the nodes 30.

In the present example, as a result of the reassignment, as illustrated in the target-role table in FIG. 28; with respect to the partition #1, the node 30-A and the node 30-B are assigned to serve as the backup candidate nodes. Moreover, with respect to the partition #2, the node 30-B and the node 30-D are assigned to serve as the backup candidate nodes. Furthermore, with respect to the partition #3, the node 30-A and the node 30-D are assigned to serve as the backup candidate nodes.

Then, the cluster managing unit 24 distributes the target-role table to the node 30-A, the node 30-B, and the node 30-D. Subsequently, the transferring unit 35 of each of the node 30-A, the node 30-B, and the node 30-D performs long-term synchronization processing with respect to the portion of difference between the current-role table and the target-role table.

That is, the transferring unit 35 of the node 30-B sends the data pieces of the partition #2 to the node 30-D in the background. Moreover, the transferring unit 35 of the node 30-A sends the data pieces of the partition #3 to the node 30-D in the background. At that time, each transferring unit 35 performs the long-term synchronization processing without discontinuing the operations with respect to the access request from the client.

As a result, the node 30-D can store therein a replica of the data pieces of the partition #2. Moreover, as illustrated in the data retention table in FIG. 28, the time stamps of the nodes 30-B and 30-D have the same value for the partition #2.

Besides, the node 30-D can store therein a replica of the data pieces of the partition #3. Moreover, as illustrated in the data retention table in FIG. 28, the time stamps of the nodes 30-A and 30-D have the same value for the partition #3.

Figure 29:
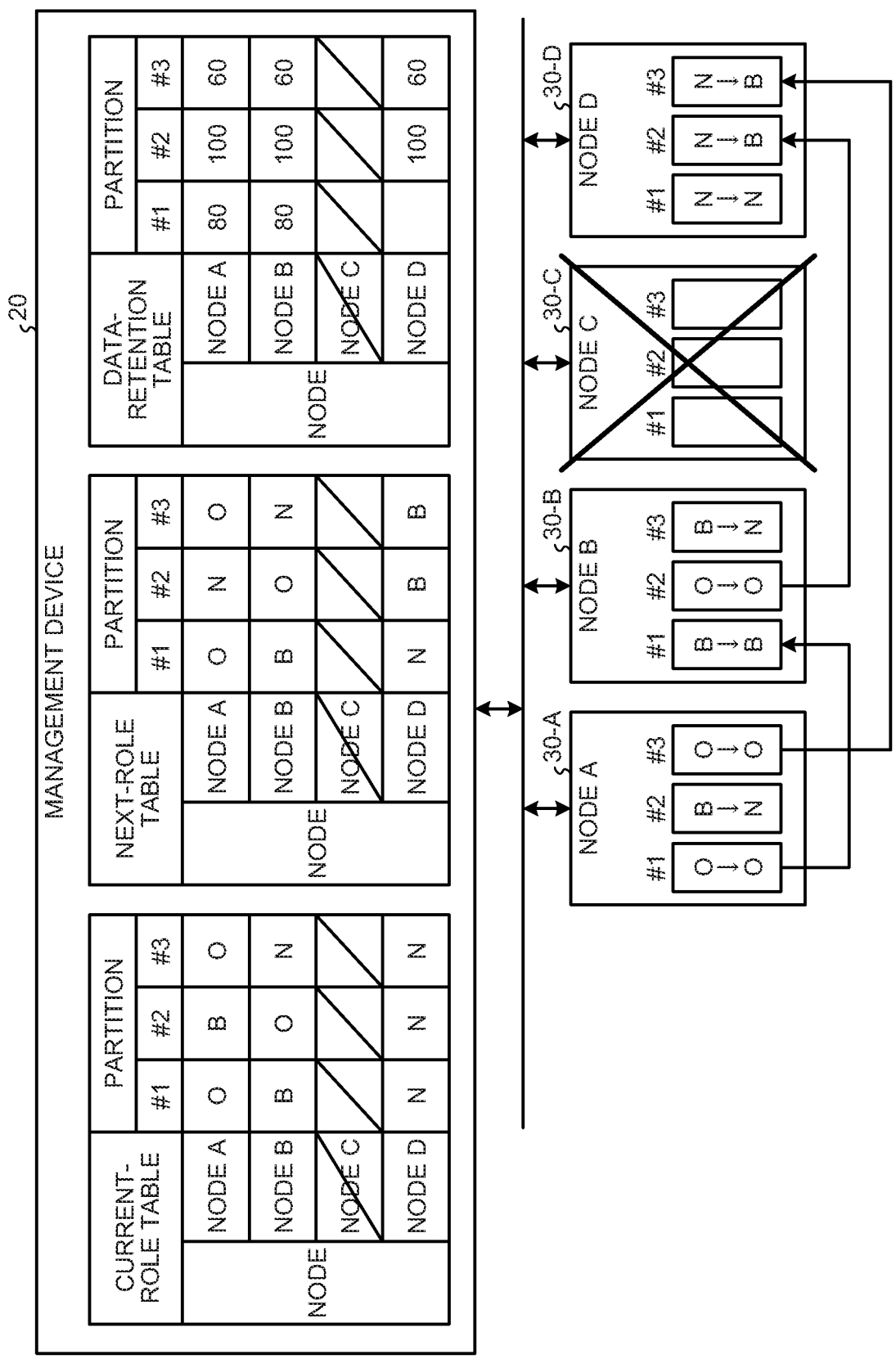
FIG. 29 is a diagram illustrating the states of the node 30-A to the node 30-D after short-term synchronization processing is performed upon completion of the long-term synchronization processing explained with reference to FIG. 28.

FIG. 29 is a diagram illustrating the states of the node 30-A to the node 30-D after short-term synchronization processing is performed upon completion of the long-term synchronization processing explained with reference to FIG. 28. Upon being called by the cluster managing unit 24 after the completion of the long-term synchronization processing, the first assigning unit 22 reassigns, with respect to each of a plurality of partitions, the nodes 30 to serve as the owner node and the backup node in such a way that the processing load becomes more equal among the nodes 30 using the replicas generated in the long-term synchronization processing.

In the present example, as a result of the reassignment, as illustrated in the next-role table in FIG. 29; with respect to the partition #1, the node 30-A is assigned to serve as the owner node and the node 30-B is assigned to serve as the backup node. Moreover, with respect to the partition #2, the node 30-B is assigned to serve as the owner node and the node 30-D is assigned to serve as the backup node. Furthermore, with respect to the partition #3, the node 30-A is assigned to serve as the owner node and the node 30-D is assigned to serve as the backup node.

Then, the cluster managing unit 24 distributes the next-role table to the node 30-A, the node 30-B, and the node 30-D. Upon receiving the next-role table, the node managing unit 34 of each of the node 30-A, the node 30-B, and the node 30-D performs short-term synchronization processing and rewrites the contents of the current-role table with the contents of the next-role table. With that, each of the node 30-A, the node 30-B, and the node 30-D becomes able to perform operations according to its newly-assigned role.

In this way, in the database system 10 according to the present embodiment, a node 30 that would serve as the backup candidate node is assigned, and the data pieces are transferred from a node 30 assigned to serve as the owner node to the node 30 assigned to serve as the backup candidate node. As a result, it becomes possible to ensure redundancy of the database and to even out the processing load of each of a plurality of nodes 30. Besides, in the database system 10, such operations can be performed without discontinuing the operations with respect to the access request from the client. Hence, even if a node 30 is separated off or a node 30 is newly added, data relocation can be done without stopping the system.

Meanwhile, computer programs executed in the management device 20 and the nodes 30 according to the present embodiment are recorded in the form of installable or executable files in a computer-readable recording medium such as a CD-ROM, a flexible disk (FD), a CD-R, or a DVD (Digital Versatile Disk).

Alternatively, the computer programs executed in the management device 20 and the nodes 30 according to the present embodiment can be saved as downloadable files on a computer connected to the Internet or can be made available for distribution through a network such as the Internet.

Still alternatively, the computer programs executed in the management device 20 and the nodes 30 according to the present embodiment can be stored in advance in a ROM or the like.

The computer program executed in the management device 20 according to the present embodiment contains a module for each of the abovementioned constituent elements (the table memory unit 21, the first assigning unit 22, the second assigning unit 23, and the cluster managing unit 24). As the actual hardware, for example, a CPU (processor) reads the computer program from the abovementioned recording medium and runs it such that the computer program is loaded in a main memory device. As a result, the table memory unit 21, the first assigning unit 22, the second assigning unit 23, and the cluster managing unit 24 are generated in the main memory device.

Similarly, the computer program executed in the nodes 30 according to the present embodiment contains a module for each of the abovementioned constituent elements (the data storing unit 31, the table memory unit 32, the access processing unit 33, the node managing unit 34, and the transferring unit 35). As the actual hardware, for example, a CPU (processor) reads the computer program from the abovementioned recording medium and runs it such that the computer program is loaded in a main memory device. As a result, the data storing unit 31, the table memory unit 32, the access processing unit 33, the node managing unit 34, and the transferring unit 35 are generated in the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A database system comprising:
    a plurality of nodes storing therein a plurality of partitions obtained by partitioning a database; and
    a management device configured to manage the plurality of nodes, wherein
    the management device comprises:
        a first assigning unit configured to, with respect to each of the plurality of partitions, assign one of the plurality of nodes as an owner node, and assign at least one of the plurality of nodes other than the owner node as a backup node, and to instruct each of the plurality of nodes to perform an operation according to assignment; and
        a second assigning unit configured to, with respect to each of the plurality of partitions, be capable of assigning at least one of the plurality of nodes other than the owner node and the backup node as a backup candidate node, and to instruct each of the plurality of nodes to perform an operation according to assignment, and wherein
    with respect to each of the plurality of partitions:
        the owner node is configured to perform a response processing according to an access request with respect to data pieces of a corresponding partition;
        the backup node is configured to, when the data pieces of the corresponding partitions stored in the owner node are updated by the response processing, update data pieces of the corresponding partition stored in the backup node so as to synchronize the data pieces stored in the backup node with the data pieces stored in the owner node; and
        the owner node or the backup node is configured to send, to the backup candidate node, a snapshot of the data pieces respectively stored therein at a first point of time and an operation log according to the access request with respect to the data pieces of the owner node at and after the first point of time, in a background while not interrupting a processing that is in response to an access request, and
        as a result of sending the data pieces from the owner node or the backup node to the backup candidate node and when the node assigned as the backup candidate node becomes operable as the owner node, the first assigning unit is configured to, with respect to each of the plurality of partitions, reassign one of the plurality of nodes as the owner node, and reassign at least one of the plurality of nodes other than the owner node as a backup node.

2. The database system according to claim 1, wherein
    the owner node or the backup node sends an operation log according to an access request for updating and registering data pieces of the owner node at and after the first point of time to the backup candidate node.

3. The database system according to claim 1, wherein
    the owner node or the backup node reduces a speed of a registering and updating operation according to an access request from a client to a speed lower than a predetermined speed while sending the snapshot of the data pieces and the operation log to the backup candidate node.

4. The database system according to claim 3, wherein
    the owner node on the backup node sets a throughput per unit time of a resource that performs an operation of sending the snapshot of the data pieces and the operation log higher than a referential set value.

5. The database system according to claim 3, wherein,
    the owner node on the backup node temporarily stops, for a predetermined time period, the registering and updating operation according to the access request from the client.

6. A node that is included in a database system, the database system comprising:
    a plurality of nodes, each storing therein a plurality of partitions obtained by partitioning a database; and
    a management device configured to manage the plurality of nodes, wherein the management device comprises:
        a first assigning unit configured to, with respect to each of the plurality of partitions, assign one of the plurality of nodes as an owner node, and assign at least one of the plurality of nodes other than the owner node as a backup node, and to instruct each of the plurality of nodes to perform an operation according to assignment; and
        a second assigning unit configured to, with respect to each of the plurality of partitions, be capable of assigning at least one of the plurality of nodes other than the owner node and the backup node as a backup candidate node, and to instruct each of the plurality of nodes to perform an operation according to assignment, and wherein
    with respect to each of the plurality of partitions:
        the owner node is configured to perform a response processing according to an access request with respect to data pieces of a corresponding partition;
        the backup node is configured to, when the data pieces of the corresponding partition stored in the owner node are updated by the response processing, update data pieces of the corresponding partition stored in the backup node so as to synchronize the data pieces stored in the backup node with the data pieces stored in the owner node; and
        the owner node or the backup node is configured to send, to the backup candidate node, a snapshot of the data pieces respectively stored therein at a first point of time and an operation log according to the access request with respect to the data pieces of the owner node at and after the first point of time, in a background while not interrupting a processing that is in response to an access request, and
        as a result of sending data pieces from the owner node or the backup node to the backup candidate node and when the node assigned as the backup candidate node becomes operable as the owner node, the first assigning unit is configured to, with respect to each of the plurality of partitions, reassign one of the plurality of nodes as the owner node, and reassign at least one of the plurality of nodes other than the owner node as a backup node.

7. A data processing method implemented in a database system that includes a plurality of nodes, each node storing therein a plurality of partitions obtained by partitioning a database and that includes a management device which manages the plurality of nodes, wherein
the management device executes:
a first assigning step that, with respect to each of the plurality of partitions, includes assigning one of the plurality of nodes as an owner node, and assigning at least one of the plurality of nodes other than the owner node as a backup node, and includes instructing each of the plurality of nodes to perform an operation according to assignment; and
a second assigning step that, with respect to each of the plurality of partitions, includes being capable of assigning at least one of the plurality nodes other than the owner node and the backup node as a backup candidate node, and includes instructing each of the plurality of nodes to perform an operation according to assignment, and wherein
with respect to each of the plurality of partitions:
the owner node is configured to perform a response processing according to an access request with respect to data pieces of a corresponding partition;
the backup node is configured to, when the data pieces of the corresponding partition stored in the owner node are updated by the response processing, update data pieces of the corresponding partition stored in the backup node so as to synchronize the data pieces stored in the backup node with the data pieces stored in the owner node; and
the owner node on the backup node is configured to send, to the backup candidate node, a snapshot of the data pieces respectively store therein at a first point of time and an operation log according to the access request with respect to the data pieces of the owner node at and after the first point of time, in a background while not interrupting a processing that is in response to an access request, and
as a result of sending the data pieces from the owner node or the backup node to the backup candidate node and when the node assigned as the backup candidate node becomes operable as the owner node, the first assigning step, with respect to each of the plurality of partitions, reassigns one of the plurality of nodes is the owner node and reassigns at least one of the plurality of nodes other than the owner node as a backup node.

8. A management device that is included in a database system including a plurality of nodes, each storing therein a plurality of partitions obtained by partitioning a database, and that manages the plurality of nodes, the management device comprising:
a hardware processor configured to:
with respect to each of the plurality of partitions, assign one of the plurality of nodes as an owner node, and assign at least one of the plurality of nodes other than the owner node as a backup node, and instruct each of the plurality of nodes to perform an operation according to assignment; and
with respect to each of the plurality of partitions, be capable of assigning at least one of the plurality of nodes other than the owner node and the backup node as a backup candidate node, and instruct each of the plurality of nodes to perform an operation according to assignment, wherein
with respect to each of the plurality of partitions:
the owner node is configured to perform a response processing according to an access request with respect to data pieces of a corresponding partition;
the backup node is configured to, when the data pieces of the corresponding partition stored in the owner node are updated by the response processing, update data pieces of the corresponding partition stored in the backup node so as to synchronize the data pieces stored in the backup node with the data pieces stored in the owner node; and
the owner node or the backup node is configured to send, to the backup candidate node, a snapshot of the data pieces respectively stored therein at a first point of time and an operation log according to the access request with respect to the data pieces of the owner node at and after the first point of time, in a background while not interrupting a processing that is in response to an access request, and
as a result of sending the data pieces from the owner node or the backup node to the backup candidate node and when the node assigned as the backup candidate node becomes operable as the owner node, the hardware processor is configured to, with respect to each of the plurality of partitions, reassign one of the plurality of nodes as the owner node, and reassign at least one of the plurality of nodes other than the owner node as the backup node.

9. A computer program product comprising a non-transitory computer-readable medium storing programmed instructions therein and causing a computer to function as a node included in a database system, the database system including a plurality of nodes, each storing therein a plurality of partitions obtained by partitioning a database, the database system including a management device configured to manage the plurality of nodes, wherein
the management device comprises:
a first assigning unit configured to, with respect to each of the plurality of partitions, assign one of the plurality of nodes as a owner node, and assign at least one of the plurality of nodes other than the owner node as a backup node, and to instruct each of the plurality of nodes to perform an operation according to assignment; and
a second assigning unit configured to, with respect to each of the plurality of partitions, be capable of assigning at least one of the plurality of nodes other than the owner node and the backup node as a backup candidate node, and to instruct each of the plurality of nodes to perform an operation according to assignment, and wherein
with respect to each of the plurality of partitions:
the owner node is configured to perform a response processing according to an access request with respect to data pieces of a corresponding partition;
the backup node is configured to, when the data pieces of the corresponding partition stored in the owner node are updated by the response processing, update data pieces of the corresponding partition stored in the backup node so as to synchronize the data pieces stored in the backup node with the data pieces stored in the owner node; and the owner node or the backup node is configured to send, to the backup candidate node, a snapshot of the data pieces respectively stored therein at a first point of time and an operation log according to the access request with respect to the data pieces of the owner node at and after the first point of time, in a background while not interrupting a processing that is in response to an access request, and as a result of sending the data pieces from the owner node or the backup node to the backup candidate node and when the node assigned as the backup candidate node becomes operable as the owner node, the first assigning unit is configured to, with respect to each of the plurality of partitions, reassign one of the plurality of nodes as the owner node, and reassign at least one of the plurality of nodes other than the owner node as the backup node.

10. A computer program product comprising a non-transitory computer-readable medium storing programmed instructions therein and causing a computer to function as a management device included in a database system, the database system further including a plurality of nodes, each storing therein a plurality of partitions obtained by partitioning a database, the management device managing the plurality of nodes, wherein the management device comprises:
a first assigning unit configured to, with respect to each of the plurality of partitions, assign one of the plurality of nodes as an owner node, and assign at least one of the plurality of nodes other than the owner node as a backup node, and to instruct each of the plurality of nodes to perform an operation according to assignment; and a second assigning unit configured to, with respect to each of the plurality of partitions, be capable of assigning at least one of the plurality of nodes other than the owner node and the backup node as a backup candidate node, and to instruct each of the plurality of nodes to perform an operation according to assignment, and wherein with respect to each of the plurality of partitions:
the owner node is configured to perform a response processing according to an access request with respect to data pieces of a corresponding partition;

the backup node is configured to, when the data pieces of the corresponding partition stored in the owner node are updated by the response processing, update data pieces of the corresponding partition stored in the backup node so as to synchronize the data pieces stored in the backup node with the data pieces stored in the owner node; and the owner node or the backup node is configured to send, to the backup candidate node, a snapshot of the data pieces respectively stored therein at a first point of time and an operation log according to the access request with respect to the data pieces of the owner node at and after the first point of time, in a background while not interrupting a processing that is in response to an access request, and as a result of sending the data pieces from the owner node or the backup node to the backup candidate node and when the node assigned as the backup candidate node becomes operable as the owner node, the first assigning unit is configured to, with respect to each of the plurality of partitions, reassign one of the plurality of nodes as the owner node, and reassign at least one of the plurality of nodes other than the owner node as the backup node.

* * * * *